US010356682B2

(12) United States Patent
Fasil Abdul et al.

(10) Patent No.: US 10,356,682 B2
(45) Date of Patent: Jul. 16, 2019

(54) METHODS AND APPARATUSES FOR EXCHANGING INFORMATION REGARDING A DETERMINED COVERAGE EXTENSION (CE) LEVEL

(71) Applicant: Samsung Electronics Co., Ltd., Gyeonggi-do (KR)

(72) Inventors: Latheef Fasil Abdul, Bangalore (IN); Abhimanyu Ingale Mangesh, Bangalore (IN); Sharma Neha, Banglore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/577,198

(22) PCT Filed: May 27, 2016

(86) PCT No.: PCT/KR2016/005652
§ 371 (c)(1),
(2) Date: Nov. 27, 2017

(87) PCT Pub. No.: WO2016/190711
PCT Pub. Date: Dec. 1, 2016

(65) Prior Publication Data
US 2018/0176847 A1 Jun. 21, 2018

(30) Foreign Application Priority Data

May 27, 2015 (IN) .......................... 2662/CHE/2015

(51) Int. Cl.
*H04W 36/30* (2009.01)
*H04W 72/08* (2009.01)
(Continued)

(52) U.S. Cl.
CPC ......... *H04W 36/30* (2013.01); *H04J 11/0093* (2013.01); *H04L 1/189* (2013.01); *H04L 1/1812* (2013.01); *H04L 1/1896* (2013.01); *H04W 16/10* (2013.01); *H04W 36/0061* (2013.01); *H04W 72/085* (2013.01); *H04W 76/10* (2018.02); *H04L 1/18* (2013.01); *H04W 24/00* (2013.01); *H04W 24/02* (2013.01); *H04W 48/20* (2013.01); *H04W 60/04* (2013.01)

(58) Field of Classification Search
CPC ............... H04W 36/30; H04W 72/085; H04W 36/0061; H04W 16/10; H04W 76/10; H04W 24/02; H04W 60/04; H04W 48/20; H04W 24/00; H04L 1/1896; H04L 1/1812; H04L 1/189; H04L 1/18; H04J 11/0093

See application file for complete search history.

(56) References Cited

U.S. PATENT DOCUMENTS

2014/0248901 A1 9/2014 Johnsson et al.
2015/0092660 A1 4/2015 Shperling et al.
(Continued)

FOREIGN PATENT DOCUMENTS

WO WO 2014204285 12/2014
WO WO 2015012654 1/2015
(Continued)

OTHER PUBLICATIONS

U.S. Appl. No. 62/112,655. Lee et al., Measurement for Coverage Enhancement UE. [retrieved on Sep. 18, 2018]. Retrieved from: PALM. Feb. 6, 2018. pp. 1-18. (Year: 2015).*
(Continued)

*Primary Examiner* — Omar J Ghowrwal
(74) *Attorney, Agent, or Firm* — The Farrell Law Firm, P.C.

(57) ABSTRACT

Embodiments herein provide a method of managing indication of Coverage Extension (CE) level. The method includes determining the CE level from a Downlink (DL) measurement. Further, the method includes indicating the CE level determined to a Base station (BS). Further, the method includes determining a change in the CE level and indicates the change in the CE level to the BS. Further, the method includes attempting a RRC connection establishment using one of a CE specific Random Access Channel (RACH) preamble and CE specific Physical Random Access Channel (PRACH) resources.

20 Claims, 17 Drawing Sheets

(51) Int. Cl.
    *H04L 1/18*     (2006.01)
    *H04W 36/00*     (2009.01)
    *H04W 16/10*     (2009.01)
    *H04W 76/10*     (2018.01)
    *H04J 11/00*     (2006.01)
    H04W 24/02     (2009.01)
    H04W 60/04     (2009.01)
    H04W 48/20     (2009.01)
    H04W 24/00     (2009.01)

(56)     References Cited

U.S. PATENT DOCUMENTS

| | | |
|---|---|---|
| 2016/0127918 A1 | 5/2016 | Yi et al. |
| 2016/0142981 A1 | 5/2016 | Yi et al. |
| 2016/0205571 A1 | 7/2016 | Yi et al. |
| 2016/0295609 A1* | 10/2016 | Vajapeyam ............... H04L 5/14 |
| 2017/0374574 A1* | 12/2017 | Lee ....................... H04W 16/24 |

FOREIGN PATENT DOCUMENTS

| | | |
|---|---|---|
| WO | WO 2015021315 | 2/2015 |
| WO | WO 2015047767 | 4/2015 |
| WO | WO 2015057028 | 4/2015 |

OTHER PUBLICATIONS

PCT/ISA/210 Search Report issued on PCT/KR2016/005652 (pp. 6).
PCT/ISA/237 Written Opinion issued on PCT/KR2016/005652 (pp. 6).

* cited by examiner

[Fig. 1]
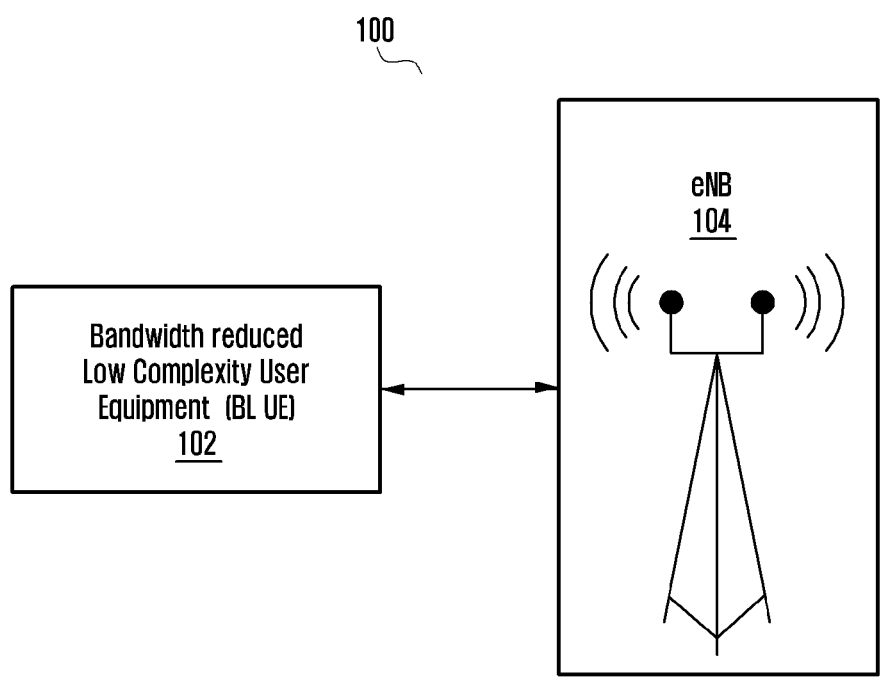

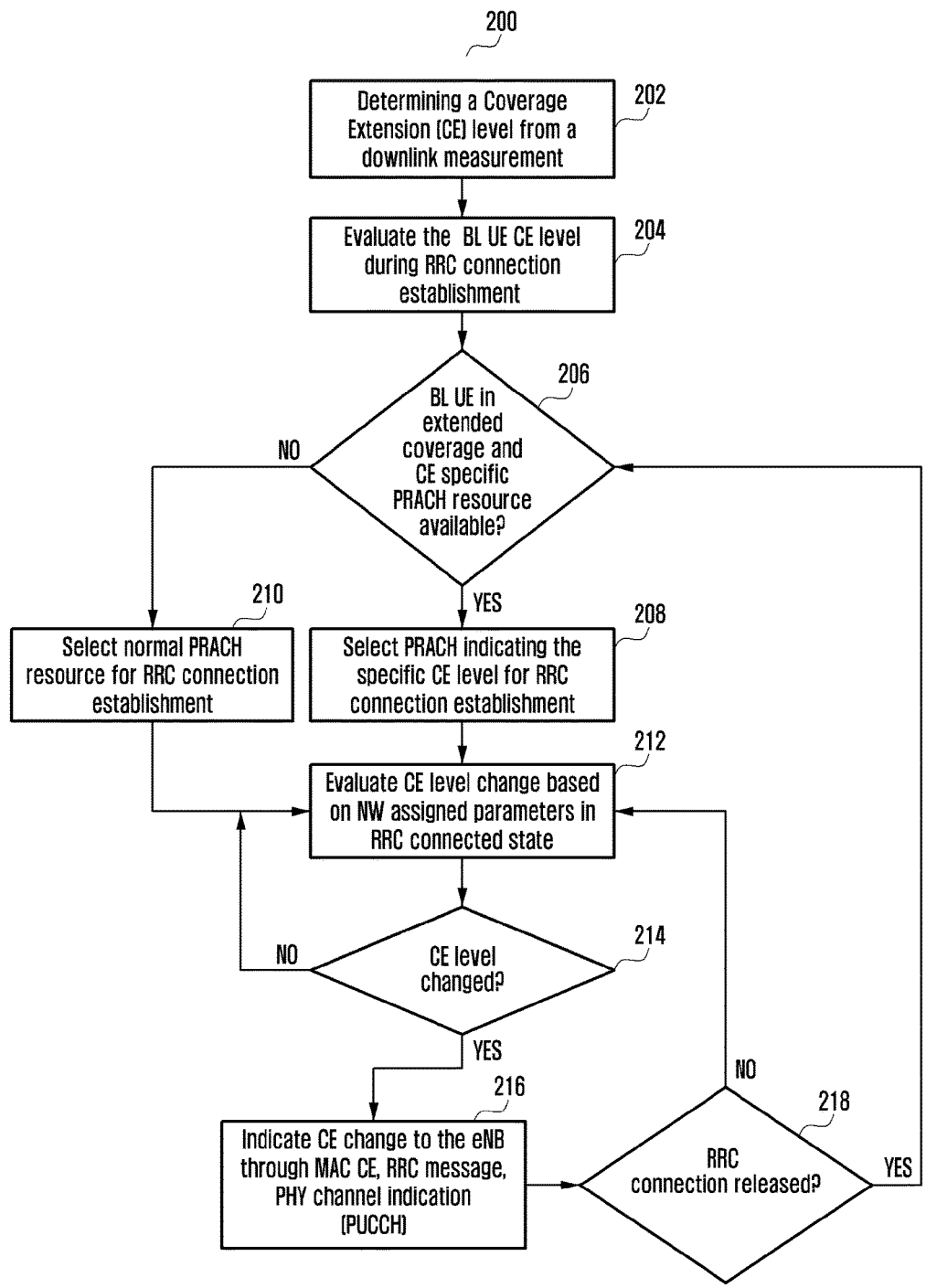
[Fig. 2]

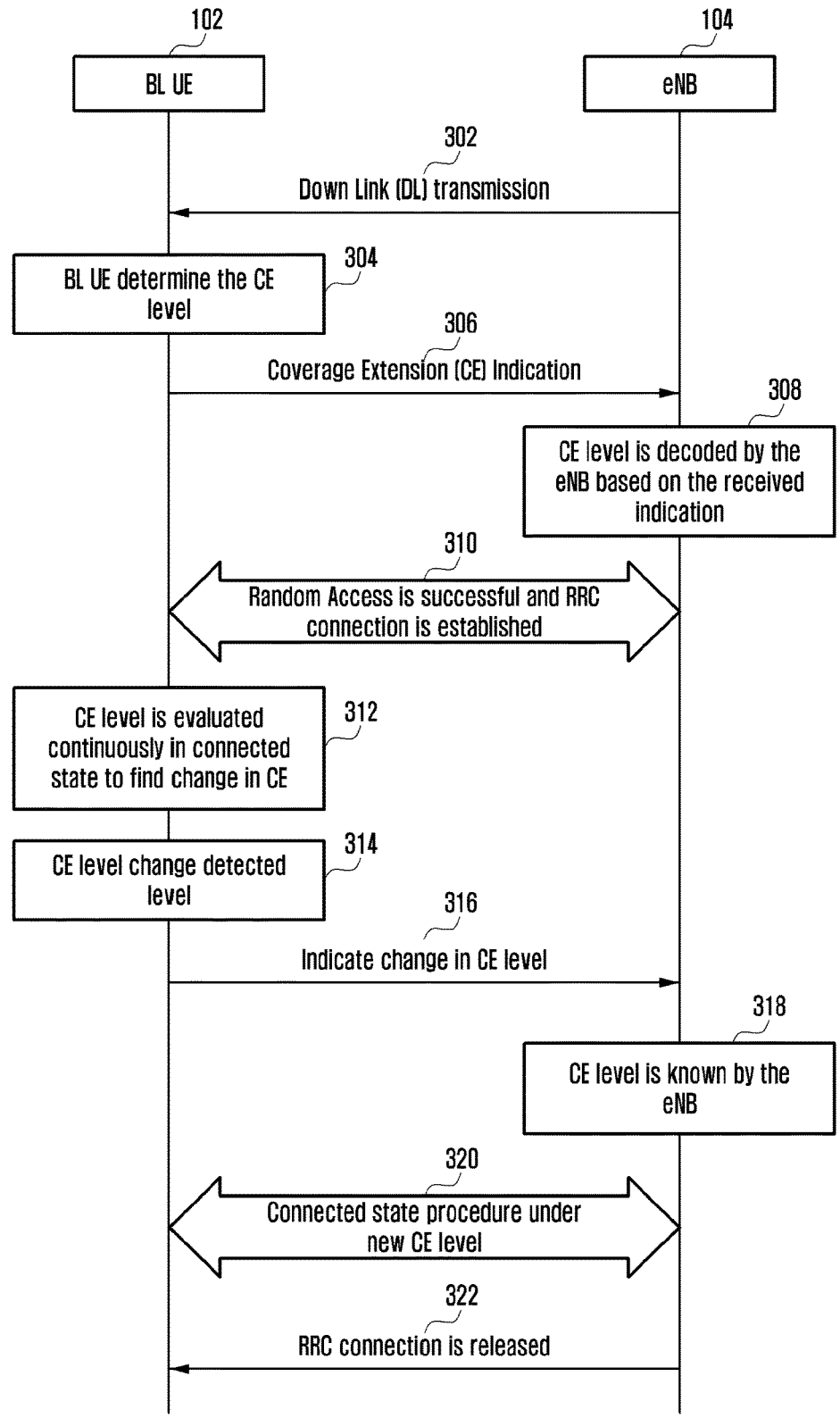

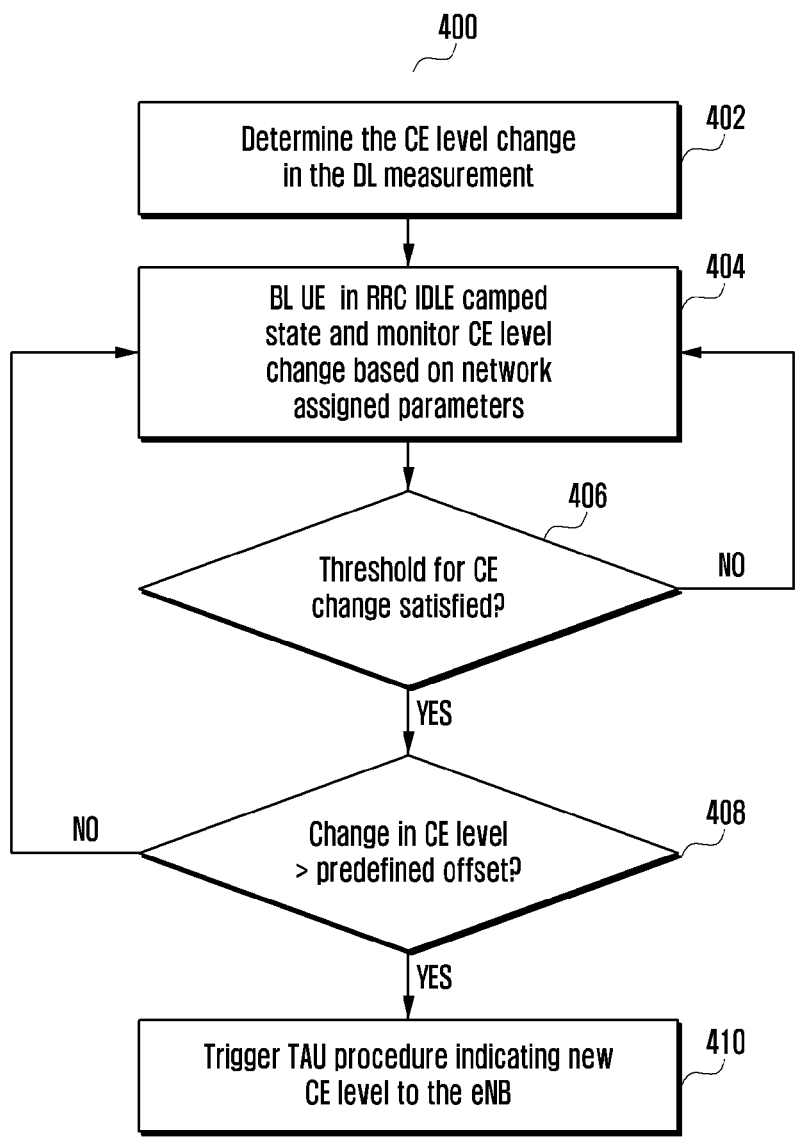
[Fig. 4]

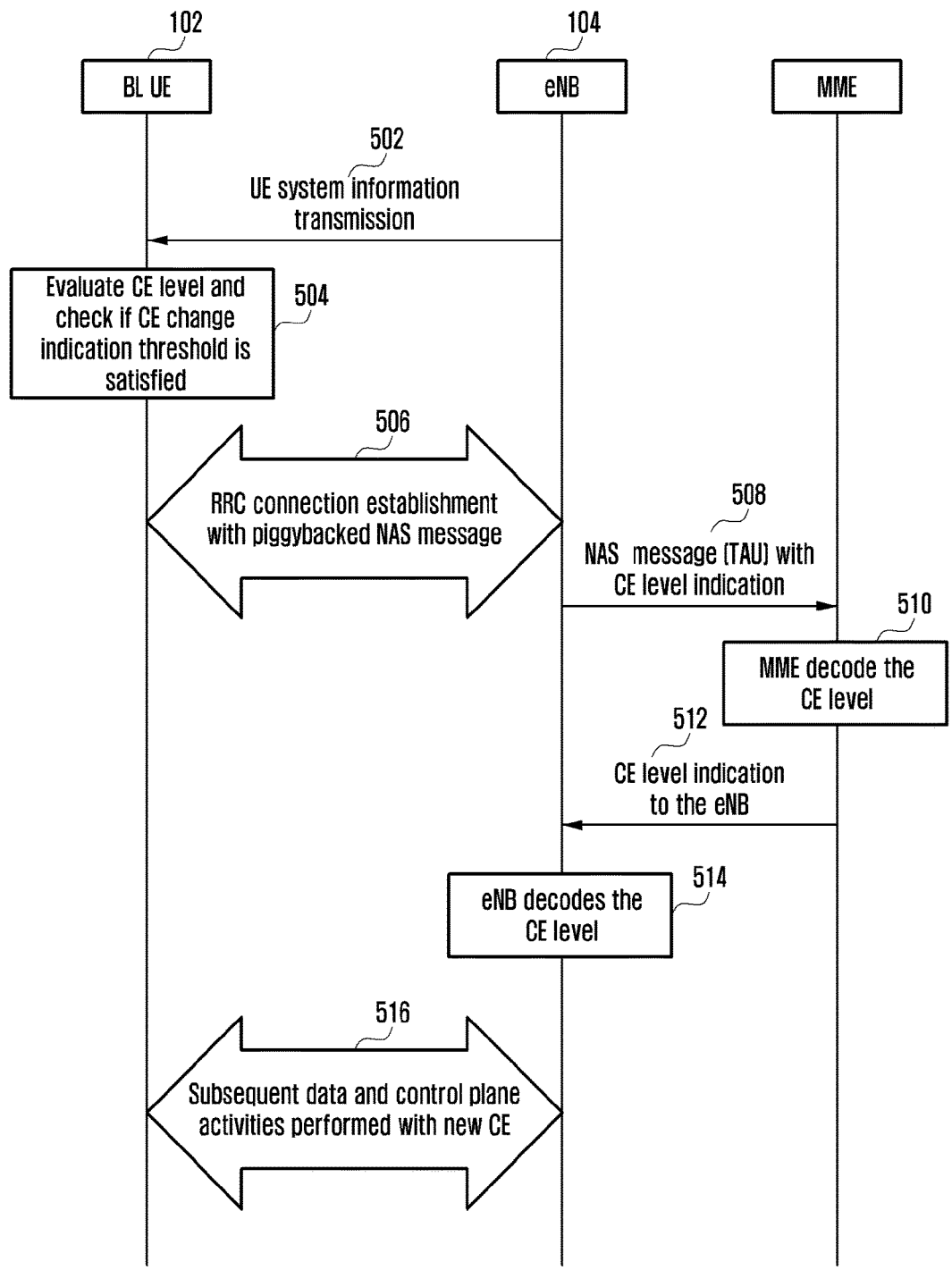

[Fig. 6]
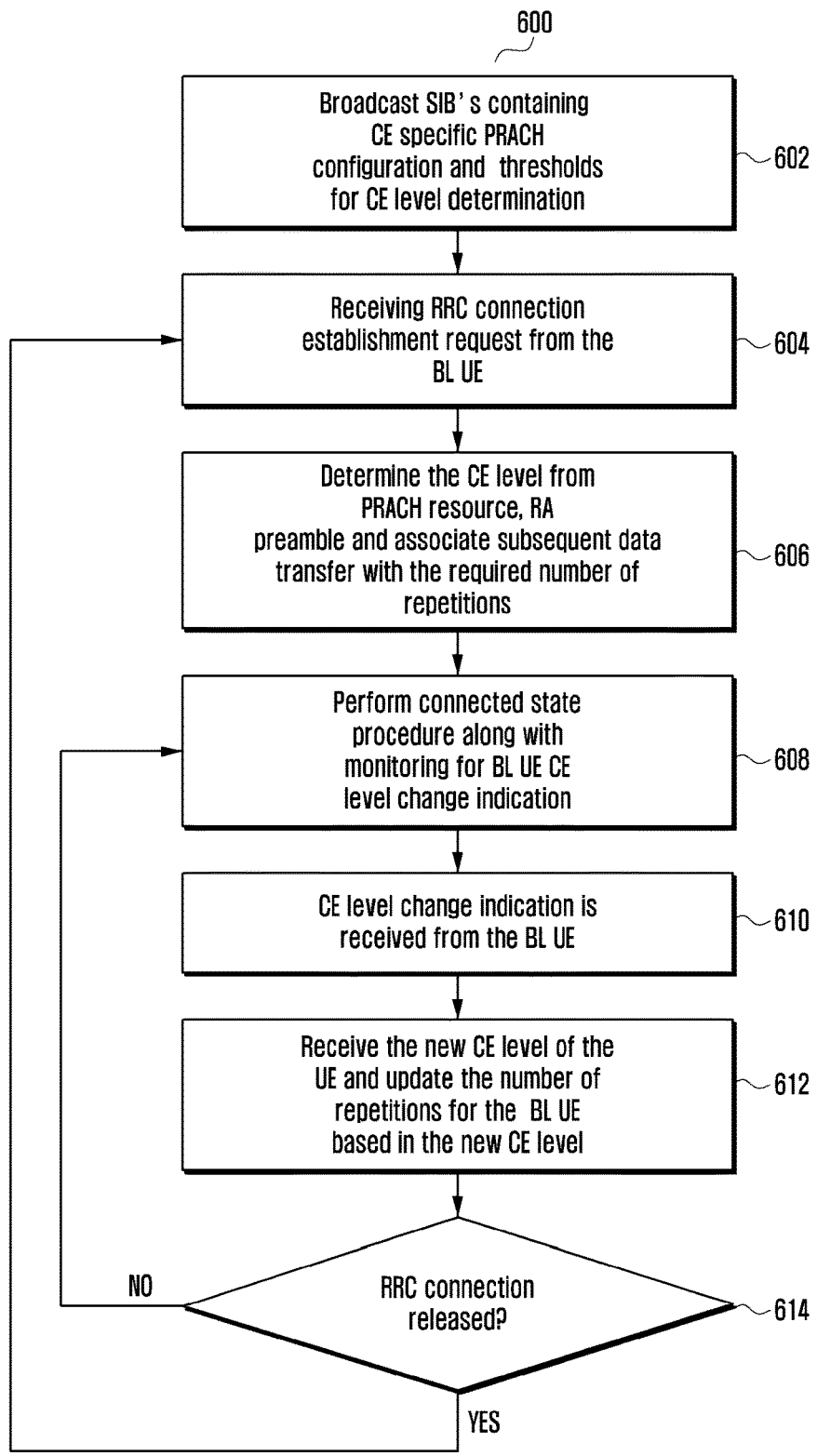

[Fig. 7]
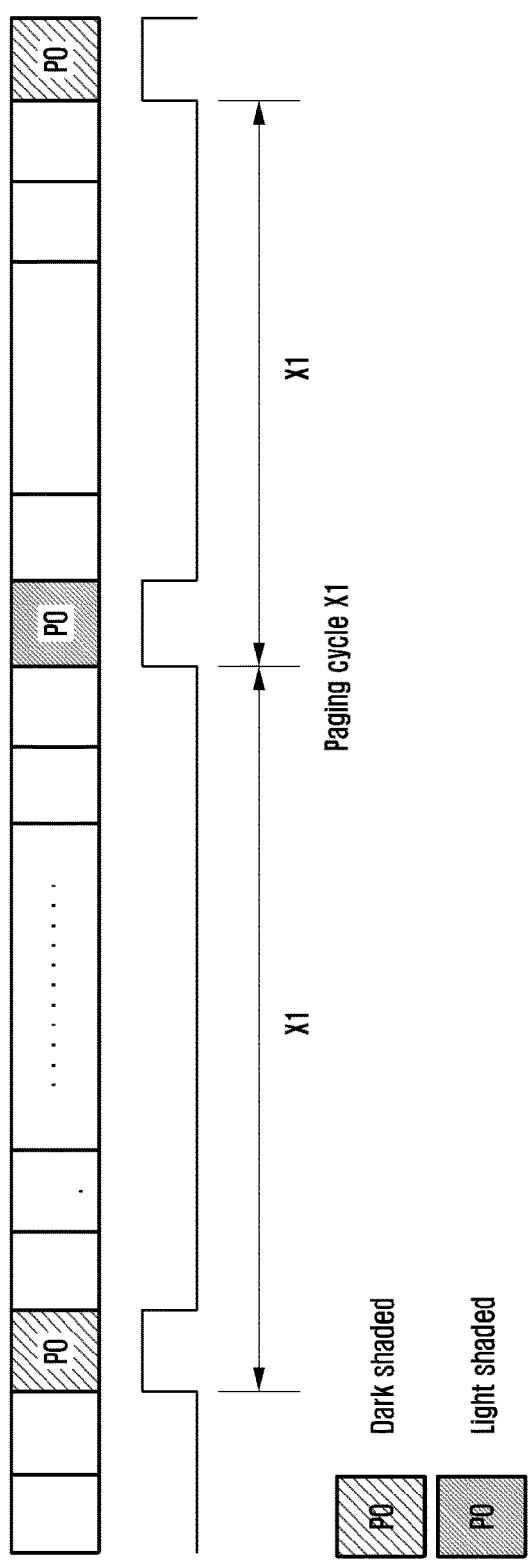

[Fig. 8]
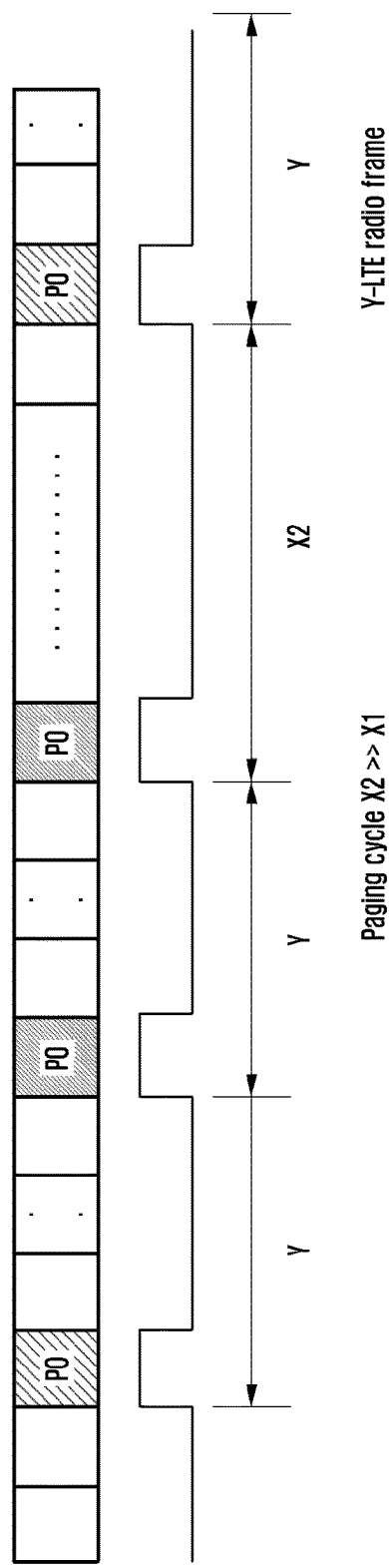

[Fig. 9]
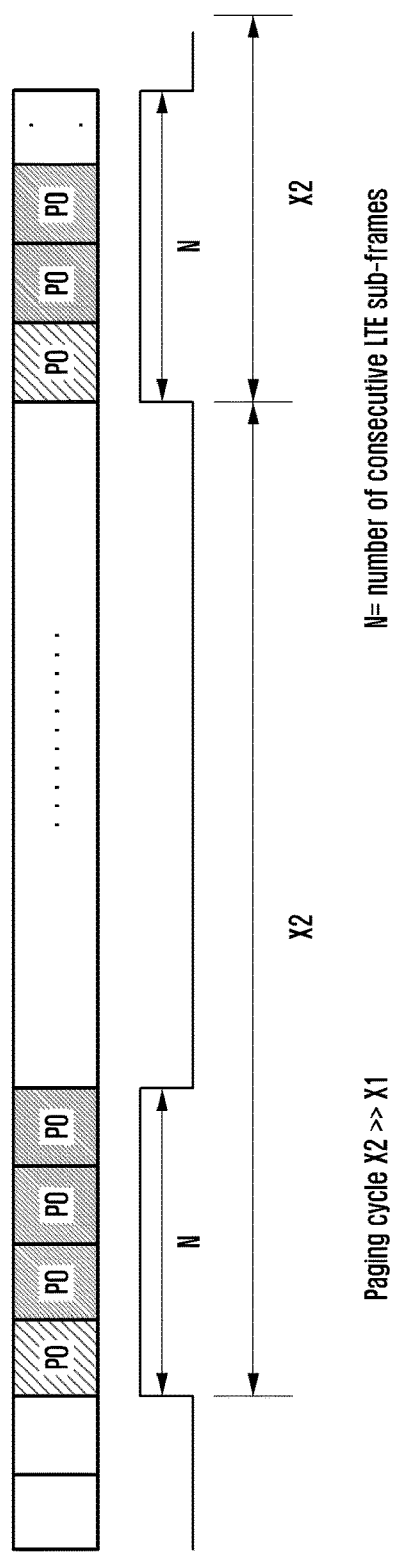

[Fig. 10]
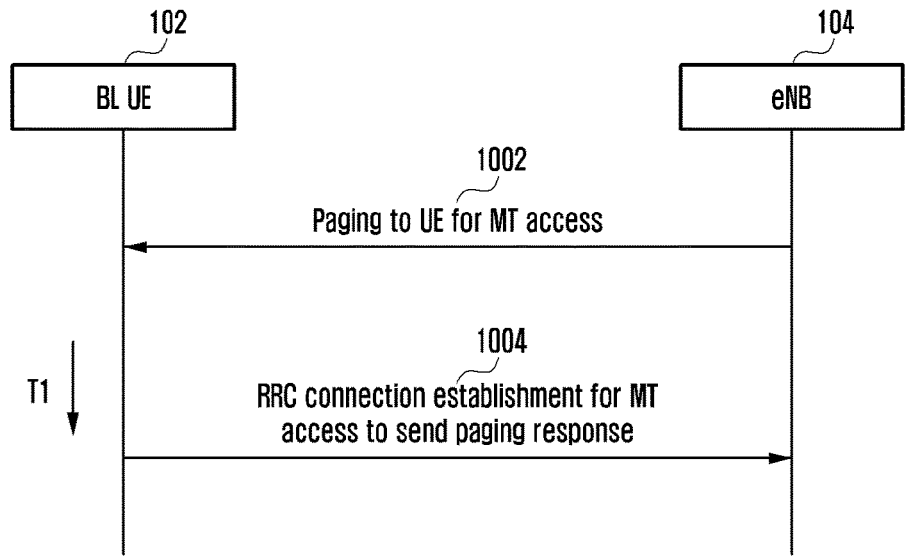
[Fig. 11]
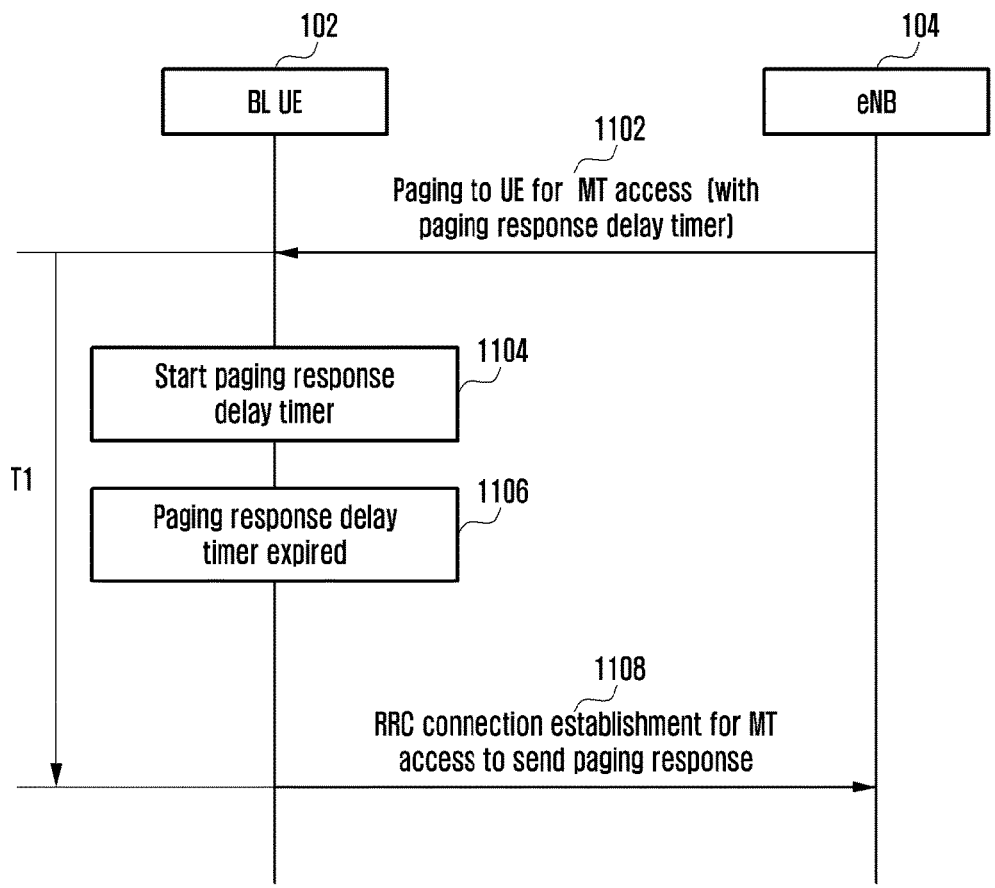

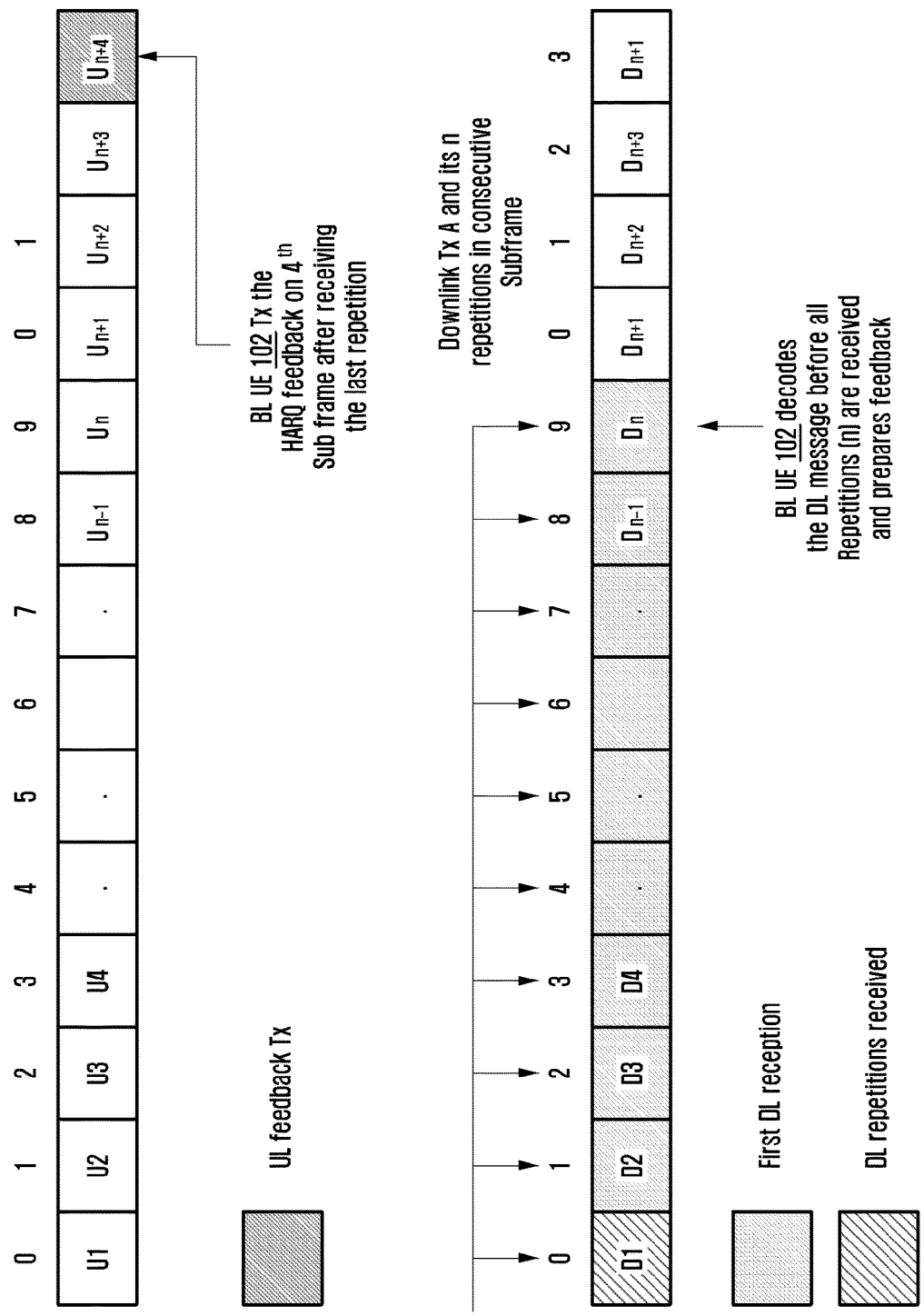
[Fig. 12]

[Fig. 13]
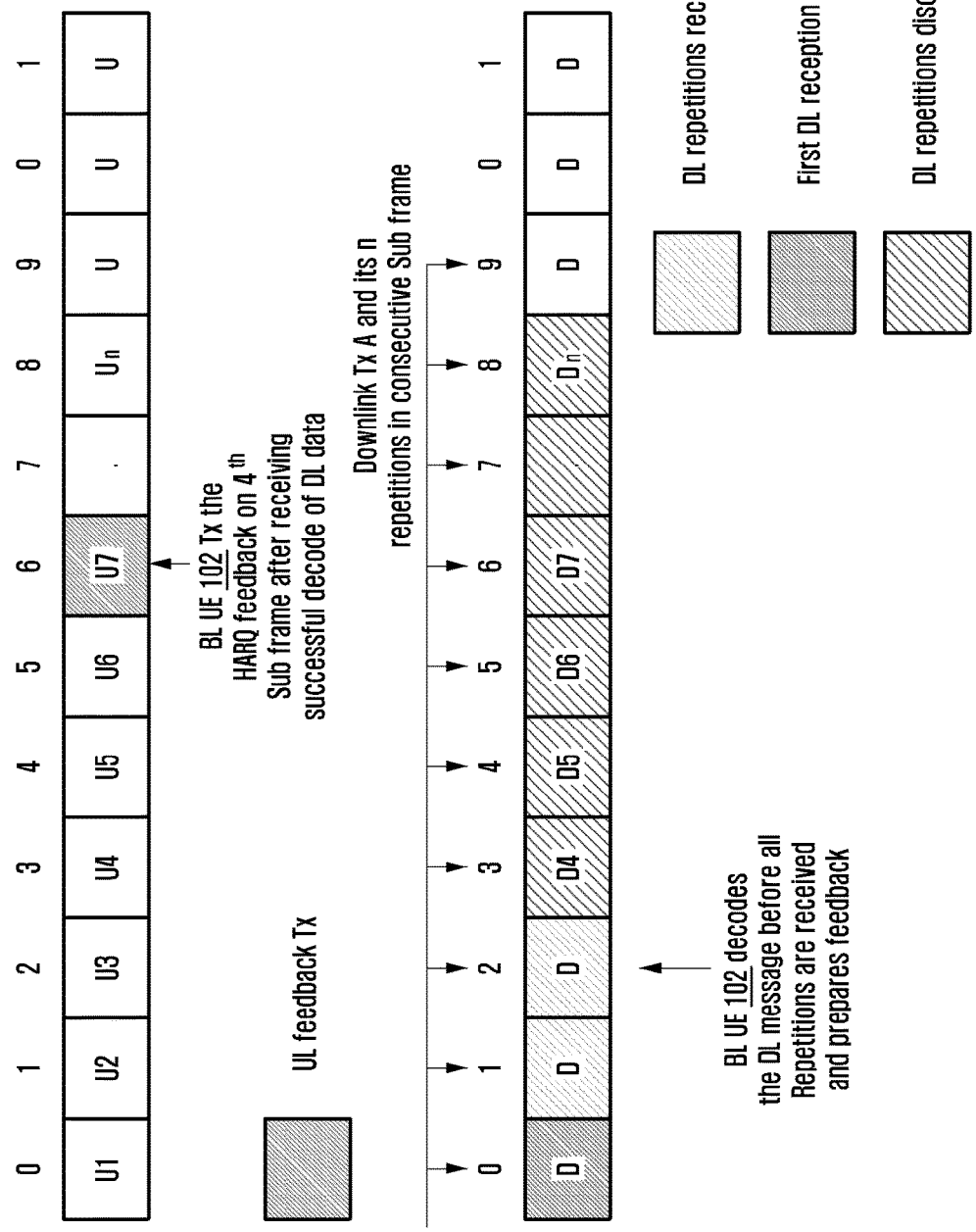

[Fig. 14]
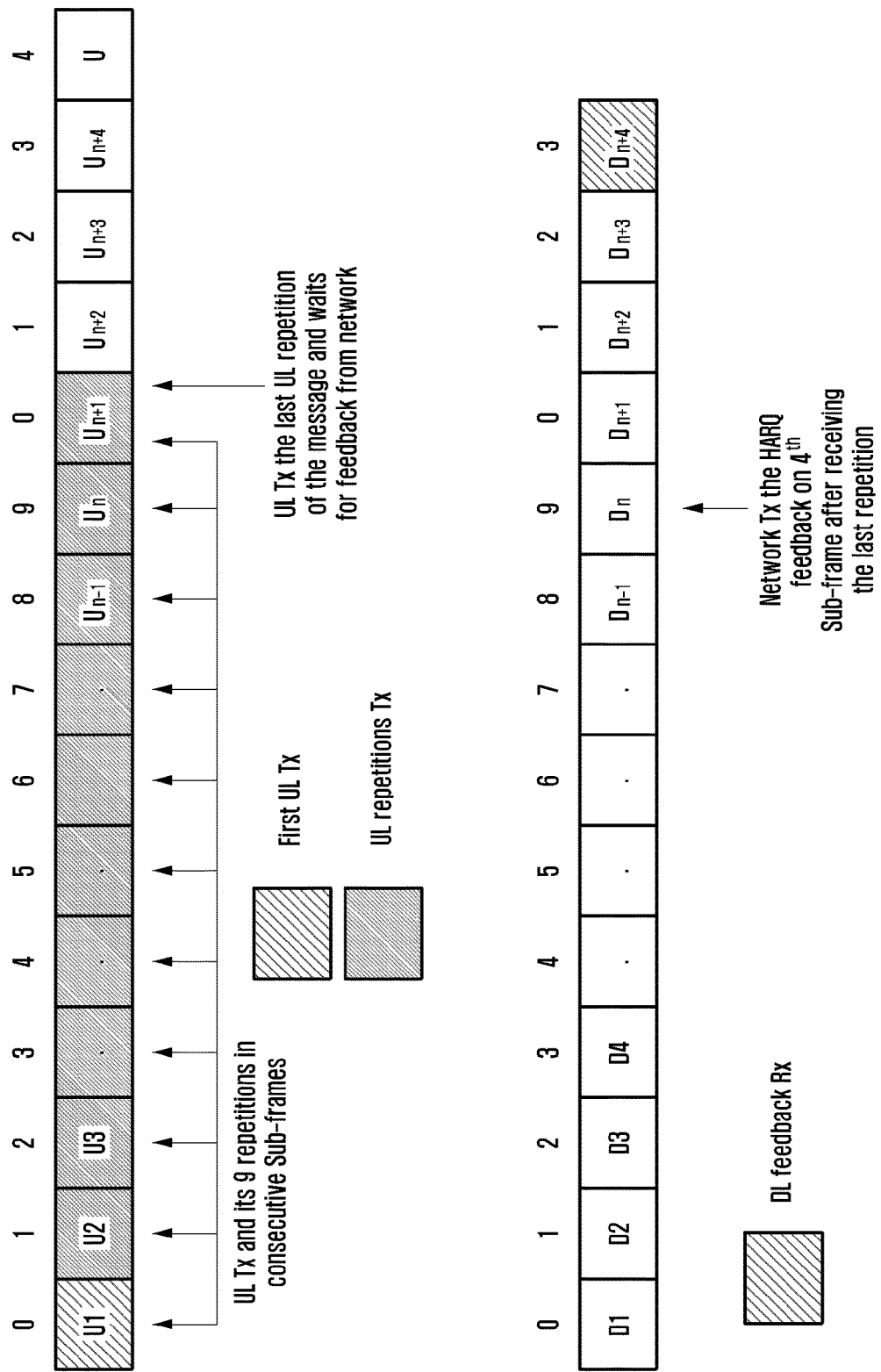

[Fig. 15]
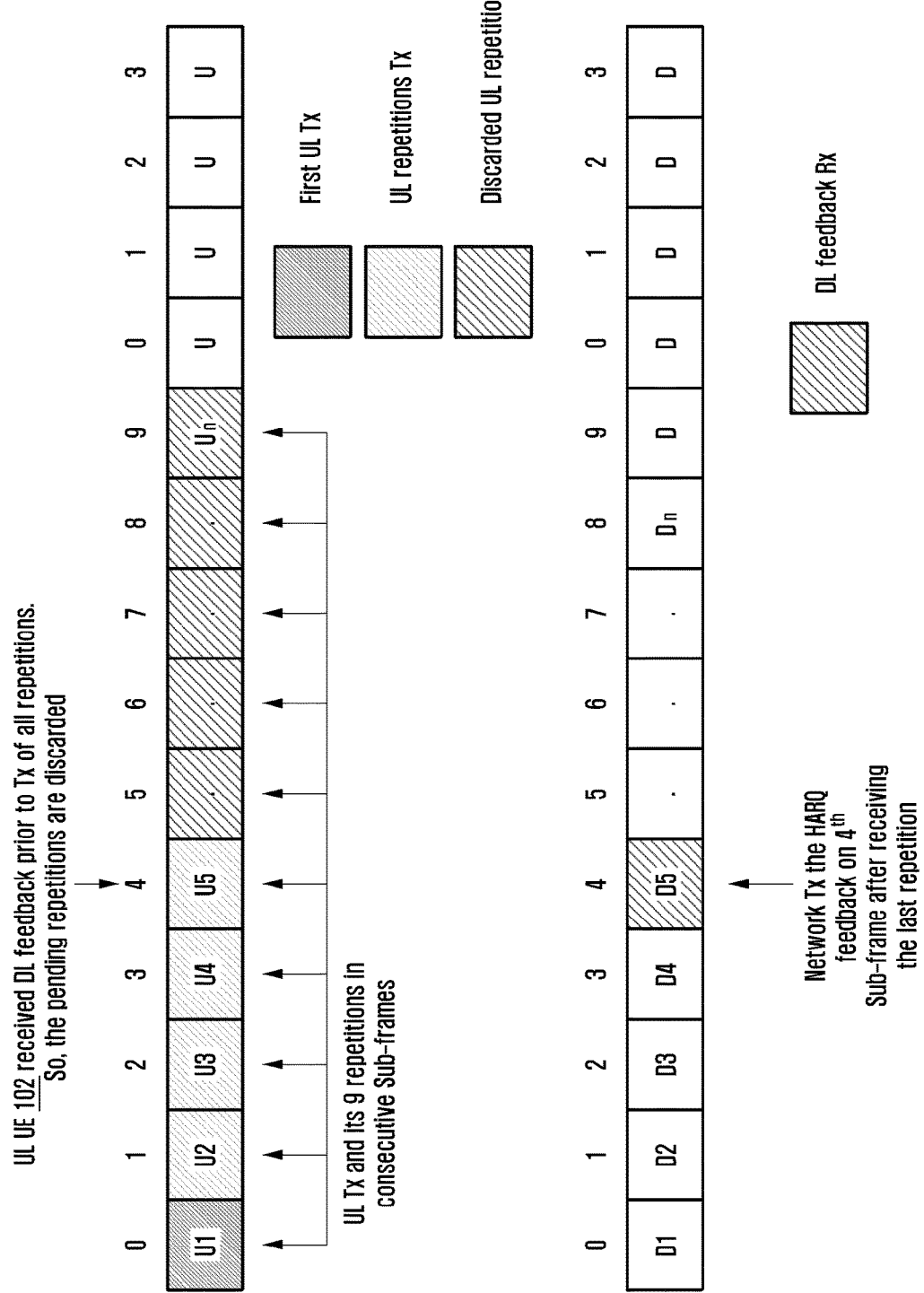

[Fig. 16]
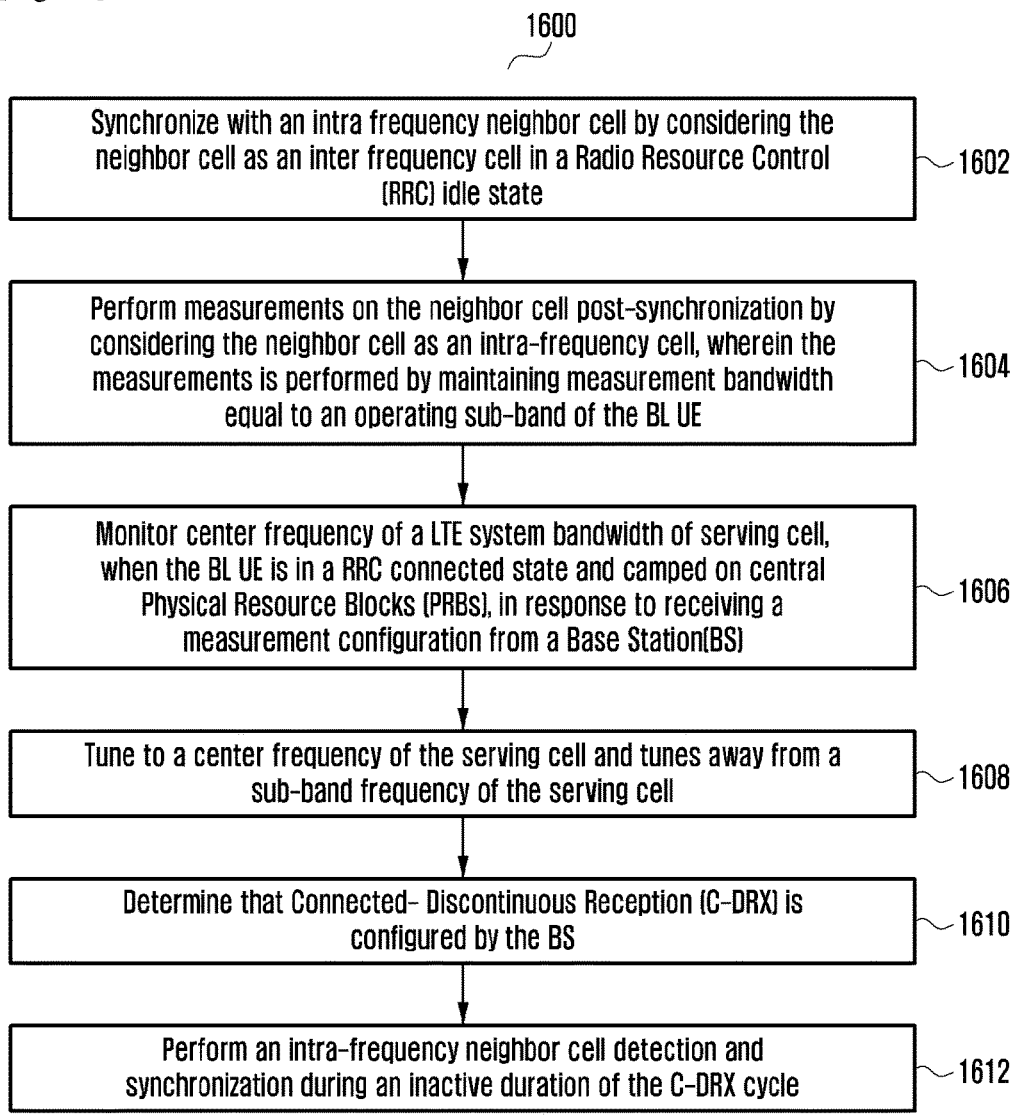

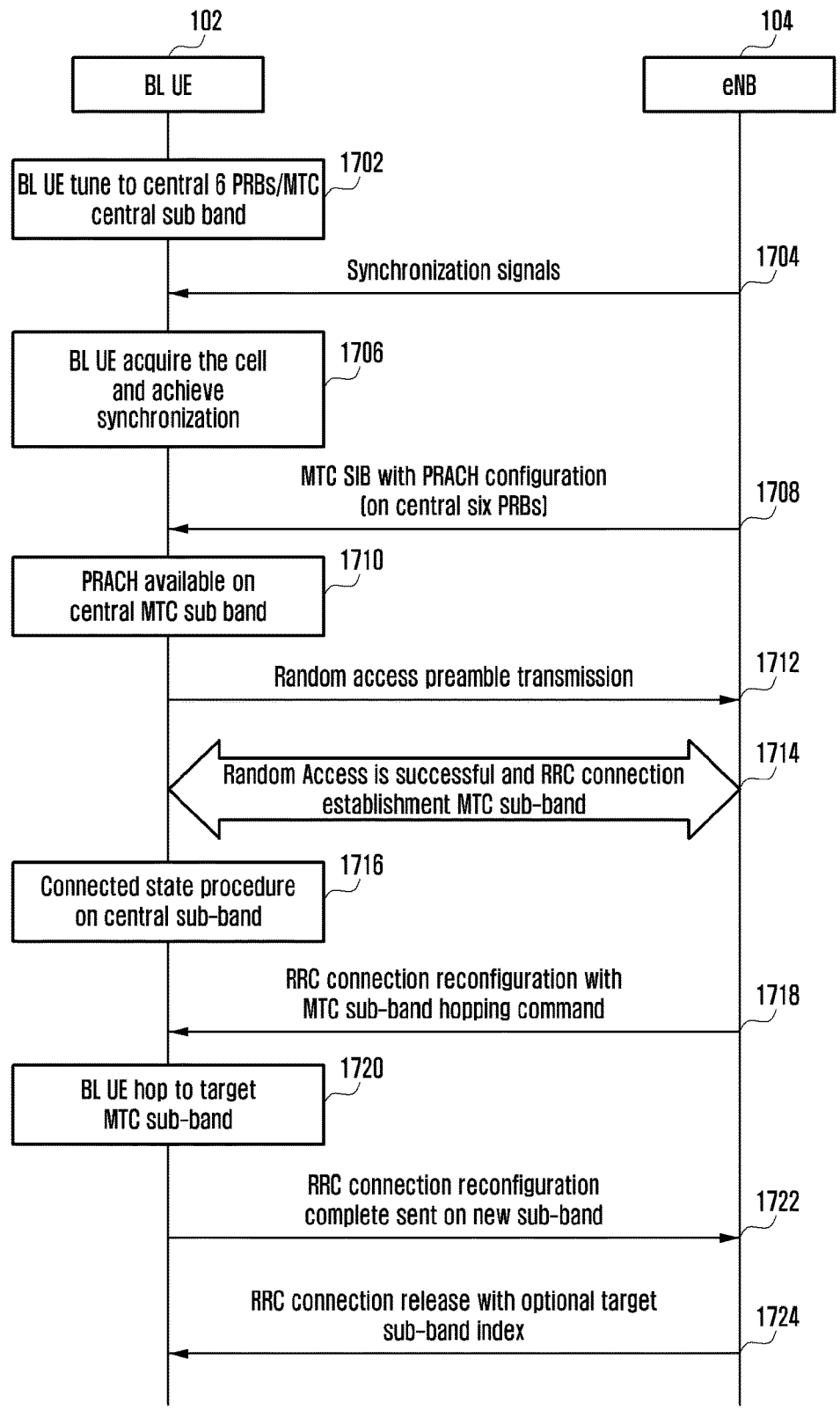

[Fig. 18]
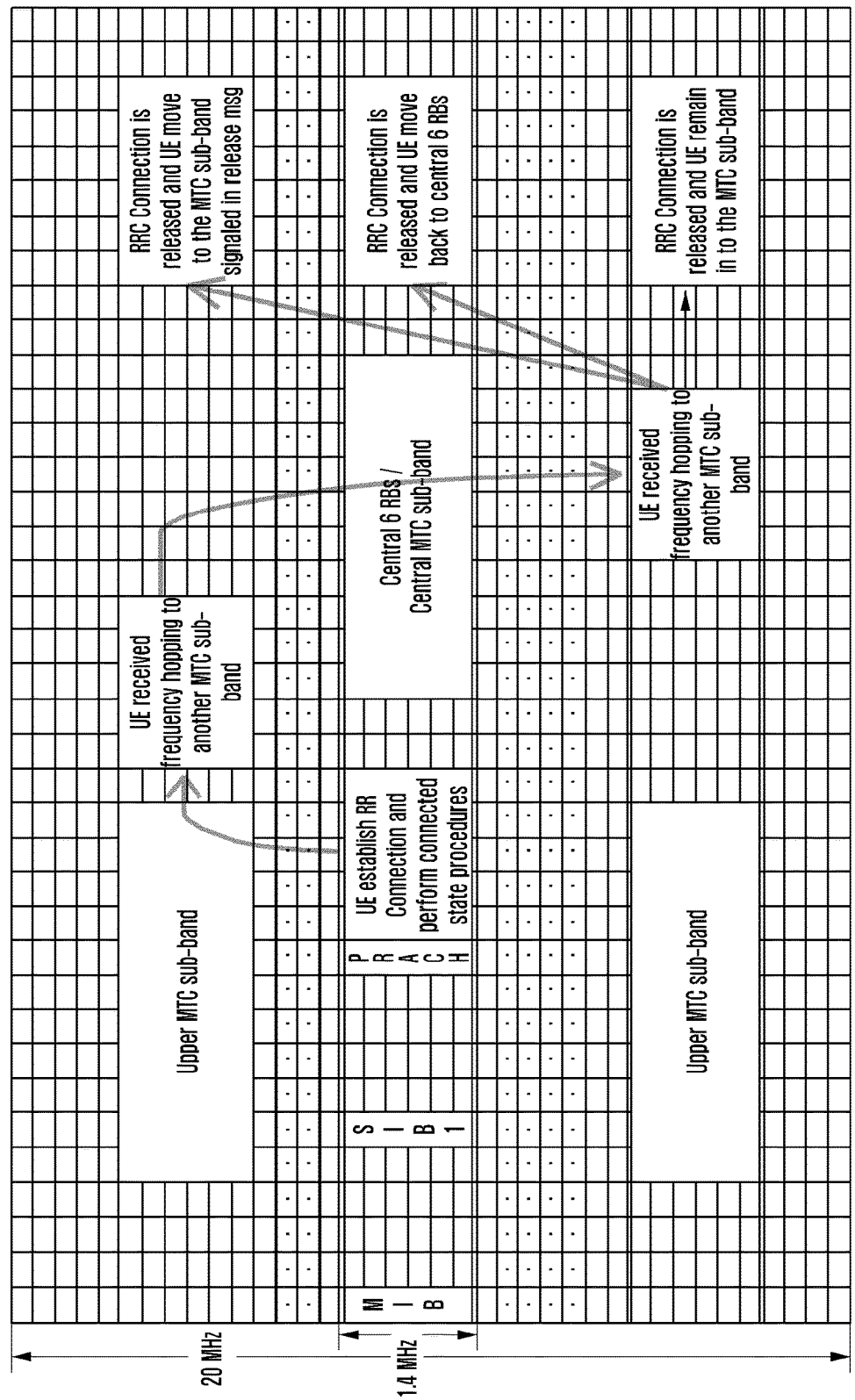

METHODS AND APPARATUSES FOR EXCHANGING INFORMATION REGARDING A DETERMINED COVERAGE EXTENSION (CE) LEVEL

PRIORITY

This application is a National Phase Entry of International Application No. PCT/KR2016/005652 which was filed on May 27, 2016, and claims priority to Indian Provisional Patent Application No. 2662/CHE/2015 PS and to Indian Complete Patent Application No. 2662/CHE/2015 CS, which were filed on May 27, 2015 and May 25, 2016, respectively, the content of each of which is incorporated herein by reference.

TECHNICAL FIELD

The embodiments herein generally relate to wireless communications. More particularly, related to a mechanism of managing indication of Coverage Extension (CE) level between a Bandwidth reduced Low complexity User Equipment (BL UE) and a base station (eNB). The present application is based on, and claims priority from an Indian Application Number 2662/CHE/2015 filed on 27 May, 2015, the disclosure of which is hereby incorporated by reference herein.

BACKGROUND ART

Machine-type communication (MTC)/Machine to Machine (M2M) communication is advancing rapidly. The MTC communication facilitates a direct communication (requiring seldom human-machine interaction) with one or more Bandwidth reduced Low complexity (BL) User Equipment(s) (UEs) deployed therein. The BL UEs (i.e., MTC/M2M devices such as Internet of Things (IoT) device(s), wireless transmit/receive units (WTRUs)) are based on 3GPP/Long Term Evolution (LTE) based protocols, with intention of saving power and reduce congestion in a network.

The 3GPP in release 13 is working on further enhancements to a physical layer (PHY) for the BL UEs which is a cellular solution towards the MTC/M2M devices. The 3GPP is working towards using the LTE as a competitive Radio Access Technology (RAT) for efficient support of the MTC. It is envisaged that BL UEs can be deployed in huge numbers, large enough to create an eco-system on its own. Lowering the cost of the BL UEs is an important enabler for implementation of the MTC/M2M devices in the eco-system. It is expected that the BL UEs can communicate to the network with infrequent small burst transmissions.

These BL UEs are expected to require low operational power consumption and hence will have limitations and restriction for following several LTE procedures. For example the LTE supports system bandwidth of up to 20 MHz per carrier and each BL UE may include two antennas and two receive RF chains. It is the 3GPP requirement that the BL UEs operates only in a limited bandwidth of 1.4 MHz. This bandwidth restriction is applicable to the downlink (DL) and uplink (UL) transmissions, the RF baseband components, the data and control channels. However, each of the BL UE should be able to hop across the entire system bandwidth with the operational bandwidth of 1.4 MHz.

The 1.4 MHz on which the BL UEs operates is termed as MTC sub-band. In order to reduce the cost of the BL UEs it is also a requirement that each of the BL UE to possess a single receive RF chain. The peak data rate of BL UEs is also restricted and the reduced operational bandwidth is one of the factors resulting in this. The maximum transport block (TB) size is not expected to be greater than 1000 bits.

In addition to cost reduction, the BL UEs can also support operation under extended coverage (i.e., Coverage Extension (CE)). This CE is achieved by performing repeated transmissions of the same message. These repetitions may be of same or different Hybrid Automatic Repeat Request (HARQ) redundancy versions (RV). There are 4 distinct CE levels including normal coverage, which will be supported by the BL UEs supporting operation under the CE mode. Each CE level is associated with a fixed number of transmission repetitions to achieve the extended coverage.

Further, for the UL transmission, as each of the BL UE by itself can calculate its serving CE level, the number of repeated versions of transmissions required is known to the BL UE. However, for an eNodeB (eNB) to send any message to the BL UE, the CE level currently serving the BL UE has to be known. Based on the knowledge of CE level, the network can then apply the number of repetitions to the message for transmission. In RRC connected state, network receives the UL transmission from the BL UE based on which the network can be able to determine the CE level of BL UE and perform the corresponding number of repeated transmissions.

In RRC idle state, as there is no UL transmission to the network based on which the network could determine the CE level for the BL UE. In order to send a paging message to the BL UE, the network needs to know the CE level of the BL UE. Therefore, it is important that the network is aware of the CE level required by the BL UE. Therefore, new procedures to determine the CE level of the BL UE and to indicate the same to the network have to be introduced.

Furthermore, in the existing LTE system, only one paging message is transmitted over one default paging cycle. There are no repetitions/retransmissions of the paging message that eNB transmit over the same paging cycle. As provisioned in the current 3GPP specifications, during idle state Discontinuous Reception (DRX) the BL UE will wake up during its calculated PF (Paging Frame) and monitor PO (Paging Occasion). PO is monitored at most once and then the BL UE moves back to the DRX sleep state. The PO and PF is calculated as shown below:

$$SFN \bmod T = (T \operatorname{div} N)*(UE\_ID \bmod N)$$

$$i\_s = \operatorname{floor}(UE\_ID/N) \bmod Ns$$

TABLE 1

Table 1: PO for FDD/Frame structure type 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

Table 2: PO for TDD/Frame structure type 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In order to accommodate for the BL UE for which multiple repetitions of paging message are to be received, the existing mechanism of paging reception is not optimal and certain optimizations are required. The optimizations for enhancing the efficiency of paging message transmission by eNB and reception by the BL UE are required.

The Random Access Channel (RACH) procedure in the LTE is a four step process where a preamble signature is transmitted to the network as MSG1. Following successful reception of the preamble by the eNB, MSG2/Random Access Response (RAR) is transmitted by the eNB 104. The RAR contains the preamble ID to which the RAR is associated and UL grants for transmitting MSG3. On successful reception of the MSG3, the network sends MSG4 which indicates the completion of the RACH procedure.

The LTE supports two Random Access (RA) preamble groups which are differentiated based on the size of the UL message to be transmitted in the MSG3 during the RACH procedure. There are multiple RA preamble formats (0-3 in case of FDD and 0-4 for TDD) in the LTE which differ in length of the sequence and its corresponding cyclic prefix. The preamble format to be used is signaled by the network over System Information (SIB's). Based on these and other parameters signaled by the network, a UE selects a preamble and transmits it to the eNB over a Physical Random Access Channel (PRACH). In order for the eNB to send RAR to the UE, the eNB shall be educated if the UE is the BL UE and the CE level required by the BL UE. Therefore, new mechanisms to signal CE level to the eNB during PRACH are required.

Mobility procedures for the BL UE are different from that of other UEs (i.e, other than the BL UE's); as the BL UEs operate in a restricted bandwidth of 1.4 MHz which the other UEs on the same cell operate on the LTE system bandwidth which may be as high as the 20 MHz. Therefore, enhancements to these mobility procedures are required.

Thus, it is desired to address the above mentioned disadvantages or other shortcomings or at least provide a useful alternative. Apart from BL UEs, these alternatives are applicable for all cases where the UE operates within a subset of the system bandwidth.

DISCLOSURE OF INVENTION

Technical Problem

The principal object of the embodiments herein is to provide a mechanism of managing indication of a CE level between a BL UE and a base station.

Another object of the embodiments herein is to provide a mechanism for determining a CE level from a Downlink (DL) measurement.

Another object the embodiments herein are to provide a mechanism for indicating the determined CE level to a Base Station (BS).

Another object of the embodiments herein is to provide a mechanism for receiving a Downlink Control Information (DCI) message from a Base Station (BS), wherein the DCI message is received through one of a Physical Downlink Control Channel (PDCCH) on each of a MTC (Machine Type Communication) sub-band and an evolved PDCCH (ePDCCH).

Another object of the embodiments herein is to provide a mechanism for decoding the DCI message to obtain a Downlink (DL) measurement.

Another object of the embodiments herein is to provide a mechanism for initiating a timing relation after last repetition of a message, wherein the last repetition provides resources for transmitting at least one of a Hybrid Automated Repeat Request (HARD) feedback by a BS and uplink data by a BL UE, wherein the last repetition is transmitted through one of a successive sub frames and periodic sub frames.

Another object of the embodiments herein is to provide a mechanism for synchronizing with an intra frequency neighbor cell by considering the neighbor cell as an inter frequency cell in a Radio Resource Control (RRC) idle state.

Another object of the embodiments herein is to provide a mechanism for performing measurements on the neighbor cell post-synchronization by considering the neighbor cell as an intra-frequency cell, wherein the measurements is performed by maintaining measurement bandwidth equal to an operating sub-band of the BL UE.

Another object of the embodiments herein is to provide a mechanism for detecting, by a BS, a CE level of a BL UE.

Solution to Problem

Accordingly the embodiments herein provide a mechanism of managing indication of Coverage Extension (CE) level between a Bandwidth reduced Low complexity User Equipment (BL UE) and a base station (eNB). The method includes determining the CE level from a Downlink (DL) measurement. Further, the method includes indicating the CE level determined to the BS.

In an embodiment, the method further includes determining a change in the CE level; indicating the change in the CE level to the BS and attempting a RRC connection establishment using one of a CE specific Random Access Channel (RACH) preamble and CE specific Physical Random Access Channel (PRACH) resources.

In an embodiment, the CE level is indicated to the BS through a Random Access Channel (RACH) procedure.

In an embodiment, the CE level is indicated through the RACH in a Physical Random Access Channel (PRACH) resource, wherein the PRACH resource is identified from a plurality of PRACH resources associated with each CE level.

In an embodiment, indicating the CE level through the RACH in the PRACH resource includes one of sharing a common PRACH resource with a different PRACH preamble format and different preamble group for the each CE level.

In an embodiment, the CE level to a Mobility Management Entity (MME) is indicated in a RRC idle state through a Tracking Area Update (TAU) message.

In an embodiment, the change in the CE level is indicated to the BS in a Radio Resource Control (RRC) connected state through a Medium Access Control (MAC) Layer control element, a RRC message, a Physical Uplink Control Channel (PUCCH).

In an embodiment, the change in the CE level is indicated to the MME through a Tracking Area Update (TAU) message.

In an embodiment, the number of PRACH resources for each subframe in a Frequency Division Duplex (FDD) frame structure is greater than one.

Accordingly, the method implemented in a Bandwidth reduced Low complexity User Equipment (BL UE), the method includes receiving a Downlink Control Information (DCI) message from a Base Station (BS), wherein the DCI message is received through one of a Physical Downlink Control Channel (PDCCH) on each of a MTC (Machine Type Communication) sub-band and an evolved PDCCH (ePDCCH).

Further, the method includes decoding the DCI message to obtain a Downlink (DL) measurement.

In an embodiment, the DCI message includes scheduling information of downlink common control messages to decode a transport block presented in a Physical Downlink Shared Channel (PDCCH).

In an embodiment, the BL UE specific ePDCCH allocation for the BL UE MTC sub-band includes six Resource Blocks (RB) pairs.

In an embodiment, transmitting the DCI message includes transmitting predefined control information over a traffic channel to decode a transport block.

Accordingly the embodiments herein provide a method and system for initiating a timing relation after last repetition of a message, wherein the last repetition provides resources for: transmitting an uplink data, by a BL UE in one of a successive sub frames and periodic sub frames and transmitting, by a BS, at least one of a Hybrid Automated Repeat Request (HARQ) feedback and a downlink data, in response to receiving the last repetition in one of successive sub frames and periodic sub frames from the BL UE.

In an embodiment, the method further includes transmitting, by the BL UE, at least one of a HARQ feedback and uplink data in one of a successive sub frames and periodic sub frames.

Accordingly the embodiments herein provide a method for synchronizing, by a BL UE, with an intra frequency neighbor cell by considering the neighbor cell as an inter frequency cell in a Radio Resource Control (RRC) idle state. Further, the method includes performing measurements on the neighbor cell post-synchronization by considering the neighbor cell as an intra-frequency cell, wherein the measurements is performed by maintaining measurement bandwidth equal to an operating sub-band of the BL UE.

In an embodiment, the method further includes monitoring center frequency of a LTE system bandwidth of the neighbor cell, when the BL UE is in a RRC connected state and camped on central Physical Resource Blocks (PRBs), in response to receiving a measurement configuration from a Base Station (BS).

In an embodiment, the BL UE tunes away from the operating sub-band frequency and tunes to the center frequency of the neighbor cell LTE system bandwidth during the measurement gap, wherein the measurement gap is received from the BS to achieve synchronization with the neighbor cell.

In an embodiment, the method further includes tuning to a center frequency of the neighbor cell and tunes away from a sub-band frequency of the neighbor cell; determining that Connected-Discontinuous Reception (C-DRX) is configured by the BS; and performing a intra-frequency neighbor cell detection and synchronization during an inactive duration of the C-DRX cycle.

In an embodiment, during synchronization with the neighbor cell, the BL UE detects a plurality of neighbor cells in proximity, wherein the BL UE is configured on central operating sub-band.

In an embodiment, the BL UE maintains synchronization information of the plurality of neighbor cells during event, wherein the synchronization information is maintained when the BL UE is in idle state knowledge achieved when the BL UE is in idle state, wherein the event corresponds to one of hopping to an operating sub-band, and a transition to a RRC connected state.

Accordingly the embodiments herein provide a method and system for detecting, at a BS a CE level of a BL UE.

In an embodiment, the method further includes applying the number of CE level specific transmission repetition for the BL UE in a downlink (DL) transmission when the BL UE in RRC idle state.

In an embodiment, the CE level specific transmission repetition is transmitted in a paging message.

Advantageous Effects of Invention

Accordingly the embodiments herein provide a mechanism of managing indication of Coverage Extension (CE) level between a Bandwidth reduced Low complexity User Equipment (BL UE) and a base station (eNB). The method includes determining the CE level from a Downlink (DL) measurement. Further, the method includes indicating the CE level determined to the BS.

Accordingly the embodiments herein provide a method and system for initiating a timing relation after last repetition of a message, wherein the last repetition provides resources for: transmitting an uplink data, by a BL UE in one of a successive sub frames and periodic sub frames and transmitting, by a BS, at least one of a Hybrid Automated Repeat Request (HARD) feedback and a downlink data, in response to receiving the last repetition in one of successive sub frames and periodic sub frames from the BL UE.

Accordingly the embodiments herein provide a method for synchronizing, by a BL UE, with an intra frequency neighbor cell by considering the neighbor cell as an inter frequency cell in a Radio Resource Control (RRC) idle state. Further, the method includes performing measurements on the neighbor cell post-synchronization by considering the neighbor cell as an intra-frequency cell, wherein the measurements is performed by maintaining measurement bandwidth equal to an operating sub-band of the BL UE.

Accordingly the embodiments herein provide a method and system for detecting, at a BS a CE level of a BL UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates an overview of a system for indicating a Coverage Extension (CE) level to a Base station (BS) in a wireless network, according to the embodiments as disclosed herein;

FIG. 2 is a flow diagram illustrating a method for indicating a CE level to a BS, according to an embodiment as disclosed herein;

FIG. 3 is a sequence diagram depicting various signaling messages between a BL UE and a BS for indicating a CE level, according to an embodiment as disclosed herein;

FIG. 4 is a flow diagram illustrating a method for indicating a CE level change to a Mobility Management Entity (MME) through Tracking Area Update (TAU), according to an embodiment as disclosed herein;

FIG. 5 is a sequence diagram depicting various signaling messages between a BL UE, a BS and a MME for indicating a CE level through a TAU, according to an embodiment as disclosed herein;

FIG. 6 is a flow diagram illustrating a method during reception of CE level change indication from the BL UE, according to an embodiment as disclosed herein;

FIGS. 7-8 illustrate CE based paging message repetition on air interface from a BS, according to embodiments as disclosed herein;

FIG. 9 illustrates CE based paging message repetition in successive sub-frames following first transmission, according to embodiments as disclosed herein;

FIG. 10 is a sequence diagram depicting various signaling messages between a BL UE and a BS for paging response to a received paging message from network, according to embodiments as disclosed herein FIG. 11 is a sequence diagram depicting various signaling messages between a BL UE and a BS for paging message response to a received paging message from the BS, following the expiry of paging response delay timer, according to embodiments as disclosed herein;

FIG. 12 illustrates UL Feedback transmission after receiving the last repetition of the message, according to embodiments as disclosed herein;

FIG. 13 illustrates UL HARQ feedback transmission immediately after successful decode of DL message before reception of last repetition, according to embodiments as disclosed herein;

FIG. 14 illustrates DL Feedback received after transmitting the last repetition of the message, according to embodiments as disclosed herein;

FIG. 15 illustrates DL feedback received immediately after successful decoded of UL message by network prior to transmission of all repetitions, according to embodiments as disclosed herein;

FIG. 16 is a flow diagram illustrating a method for RRC connection over the central six PRBs, according to embodiments as disclosed herein;

FIG. 17 is a sequence diagram depicting various signaling messages between a BL UE and a for RRC connection over the central six PRBs, according to embodiments as disclosed herein; and FIG. 18 is a screenshots indicating various functions of the BL UE, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The following documents and standards descriptions are hereby incorporated into the presented disclosure as if fully set forth herein: 3GPP TS 36.321 Section 5.1.1 [R2-161975, RP-160453], "Random Access Procedure initialization", 5.1.3 "Random Access Preamble transmission" 3GPP TS 36.211 section 5.7.1 [R1-161563, RP-160361] "5.7 Physical random access channel", 3GPP TS 36.211 section 5.7.1 [R1-161563, RP-160361] "5.7 Physical random access channel", 3GPP TS 36.331 Section 6.3.2 [R2-162040, RP-160453] "6.3.2 Radio resource control information elements", 3GPP TC 36.304 Section 5.2.3.2 [R2-162041, RP-160453] "5.2.3.2 Cell Selection Criterion", 3GPP TS 36.331 Section 6.3.4 [R2-162040, RP-160453] "6.3.4 Mobility control information elements", 3GPP TS 36.321 Section 5.3.2.1 [R2-161975, RP-160453] "5.3 DL-SCH data transfer", 3GPP TS 36.321 Section 5.4.2.1 [R2-161975, RP-160453] "5.4 UL-SCH data transfer".

Accordingly the embodiments herein provide a method for of managing an indication of Coverage Extension (CE) level between a Bandwidth reduced Low complexity User Equipment (BL UE) and a base station (eNB). The method includes determining, at a Bandwidth reduced low complexity User Equipment (BL UE), the CE level from a Downlink (DL) measurement. Further the method includes indicating the CE level to the BS.

Accordingly the embodiments herein provide a method and system for indicating the CE level to the BS in a wireless network. The method includes detecting, at the BS; a CE level of a BL UE.

Accordingly the embodiments herein provide a method for managing a common control messages received from a BS in a wireless network. The method includes receiving, at the BL UE a Downlink Control Information (DCI) message from the BS, wherein the DCI message is received through one of a Physical Downlink Control Channel (PDCCH) on each of a MTC (Machine Type Communication) sub-band and an evolved PDCCH (ePDCCH). Further, the method includes decoding the DCI message to obtain a DL measurement.

Accordingly the embodiments herein provide a method and system for providing a timing relation in data transfer. The method includes initiating a timing relation after last repetition of a message, wherein the last repetition provides resources for: transmitting an uplink data, by a BL UE in one of a successive sub frames and periodic sub frames and transmitting, by a BS, at least one of a Hybrid Automated Repeat Request (HARM) feedback and a downlink data, in response to receiving the last repetition in one of successive sub frames and periodic sub frames from the BL UE.

Accordingly the embodiments herein provide a method and system for managing an Intra-frequency measurement. The method includes synchronizing, by a BL UE, with an intra frequency neighbor cell by considering the neighbor cell as an inter frequency cell in a Radio Resource Control (RRC) idle state. Further the method includes performing measurements on the neighbor cell post-synchronization by considering the neighbor cell as an intra-frequency cell, wherein the measurements is performed by maintaining measurement bandwidth equal to an operating sub-band of the BL UE.

Unlike the conventional systems and methods, the proposed mechanism facilitates the BS to manage the number of transmission repetitions as required by the BL UE.

Unlike the conventional systems and methods, the proposed mechanism facilitates the BS to determine the change in CE level (i.e, current CE level) based on the indication received by the BL UE (i.e, BL UE in RRC connected state).

Unlike the conventional systems and methods, the proposed mechanism facilitates the BS by indicating the CE level of the BL UE thereof the network can efficiently decide on the number of repetitions or level of the CE required by each BL UE.

Unlike the conventional systems and methods, the proposed mechanism restrict a paging message transmission within the BL UE operating at 1.4 MHz, in response to receiving the CE level indication from the BL UE that that a UE to be paged is the BL UE or a normal UE (other than the BL UE) that is to be paged using the CE.

Referring now to the drawings, and more particularly to FIGS. 1 through 18, where similar reference characters denote corresponding features consistently throughout the figures, there are shown preferred embodiments.

FIG. 1 illustrates an overview of a system 100 for indicating the CE level to a Base station (BS) in the wireless network, according to the embodiments as disclosed herein. The system 100 includes a Bandwidth reduced Low Complexity User Equipment (BL UE) 102 and a Base station (i.e., eNodeB (eNB)) 104. In an embodiment, the BL UE 102 include, for example a Machine Type Communication (MTC)/Machine to Machine (M2M) device(s), Internet of Things (IoT) devices such as activity trackers, sensors, wireless transmit/receive units (WTRUs) or the like, capable of operating under low network signal bandwidth.

For the sake of brevity, the terms eNodeB (eNB) and the BS are used interchangeably.

The eNB 104 communicates with the BL UE 102 through the network. The network can include, for example at least one of Internet Protocol (IP) network, such as the Internet, a proprietary IP network, data network, or the like. In an embodiment, the network can include the eNB 104, one or more cells such as serving cell of the BL UE 102 and neighboring cell to that of the serving cell of the BL UE 102.

The eNB 104 provides wireless broadband access to the network for the BL UE 102 (or for the plurality of BL UE's) within the coverage area of the eNB 104. The coverage area of the eNB 104 can include one or more cell(s) deployed therein. In proximity to the coverage area of the eNB 104; the eNB 104 can also include one or more neighboring cell(s) (i.e., for network acquisition by the BL UE 102 during mobility).

In an embodiment, the BL UE 102 (in the RRC idle state) is configured to determine the CE level from the DL measurement, network interference, or the like. In an embodiment, the DL measurement includes a measurement report generated by the BL UE 102 in response to DL reference signal received from the eNB 104 (or, the network encompassing the eNB 104). Further, the BL UE 102 (during the RRC connection establishment) is configured to indicate the CE level determined to the eNB 104.

In an embodiment, the BL UE 102 (in the RRC connected state) is configured to evaluate the CE level at continuous interval in order to determine the change in the CE level. If the BL UE 102 determines the change in CE level, thereon the change in the CE level (i.e., CE level other than the CE level determined) can be transmitted to the eNB 104. The change in CE level is determined by continuously monitoring the CE level against target parameters assigned by the network, i.e., if the target parameters/metric assigned by the network or a combination of these parameters crosses the associated threshold(s) set by the network, as elucidated in FIG. 2. Further, the BL UE 102 (in the RRC connected state) is configured to indicate the change in the CE level determined to the eNB 104.

Unlike the conventional systems and methods, the proposed mechanism indicates the current state of the CE level associated with the BL UE 102 to the eNB 104 and in response the eNB 104 can determine the required number of the transmission repetitions to be transmitted to the BL UE 102.

The network (i.e., eNB 104) can determine the CE level of the BL UE 102; in the RRC connected state, based on an uplink (UL) measurements received from the BL UE 102. The UL measurements such as, for example, uplink (UL) Block Error Rate (BLER), path-loss, UL interference, Signal to Interference Noise Ratio (SINR), UL reference signal measurements (Reference Signal Received Power (RSRP), Reference Signal Received Quality (RSRQ), Received Signal Strength Indicator (RSSI), or the like), UL (Physical Uplink Control Channel) PUCCH power measurements, or the like.

Different threshold(s) can be set for the desired set of parameters beyond which the CE level change is detected. Separate thresholds are set to identify different CE levels (for example, CE level-1 to CE level-4).

Furthermore, when the BL UE 102 is in the RRC idle state, it is not possible for the eNB 104 to determine the CE level based on UL measurements as there is no transmission in the UL. In this scenario, the eNB 104 can maintain the last known (cached) CE level of the BL UE. The last known CE level may be the CE level used by the BL UE 102 when the last RRC connection was released by the eNB 104. Therefore, the eNB 104 may use this stored (cached) CE level value/the next (consecutive) higher CE level to determine the transmission repetitions to be applied to idle state downlink transmissions like paging message.

Unlike the conventional systems and methods, the proposed mechanisms are efficient as the BL UE 102 is expected to communicate with other BL UE's or the eNB 104 only in limited mobility and hence the CE level of the BL UE 102 may not change frequently. For example, considering the fact that the BL UE 102 such as activity trackers, emergency modules follows the specific patterns such as consistently operating (accessing the cell associated with the eNB 104 in the RRC connected state) from same premises, same location, same time interval, or the like. The CE level of the BL UE 102 accessing the network during these scenarios can be stored.

The FIG. 1 shows the system 100 but it is to be understood that other embodiments are not limited thereon. In other embodiments, the system 100 may include less or more number of components. Further, the labels or names of the components are used only for illustrative purpose and does not limit the scope of the invention. One or more components can be combined together to perform same or substantially similar function in the system 100.

FIG. 2 is a flow diagram 200 illustrating a method for indicating the CE level to the eNB 104, according to an embodiment as disclosed herein. At step 202, the method includes determining the CE level from the DL measurement. In an embodiment, the method allows the BL UE 102 to determine the CE level from the DL measurement.

At step 204, the method includes evaluating the CE level during the RRC connection establishment (i.e., indicating the CE level of the BL UE 102 to the eNB 104 during the RACH procedure).

Further, at step 206, the method includes determining if the BL UE 102 is in the extended coverage and CE specific PRACH resource is available. If the CE specific PRACH resource is available, then, at step 208, the method includes selecting the PRACH indicating the specific CE level for the RRC connection establishment with the eNB 104. In an embodiment, indicating the CE level of the BL UE 102 includes selecting different PRACH physical resource for the BL UEs with different coverage level requirements allocated by the eNB 104.

Unlike the conventional systems and methods, the proposed mechanism can share a common PRACH but use a different PRACH preamble format of different preamble group for each CE level. The different PRACH groups for each coverage level may be pre-defined or signaled by the network.

If the BL UE 102 in the extended coverage and CE specific PRACH resource is unavailable, then, at step 210, the method includes selecting normal PRACH resource for the RRC connection establishment with the eNB 104.

At step, 212 the method includes evaluating the CE level change based on the network assigned parameters in the RRC connected state. In an embodiment, the method allows the BL UE 102 to evaluate the CE level change based on the network assigned parameters, as detailed in FIG. 4.

Further, at step 214, the method includes determining if the CE level is changed. In an embodiment, the method allows the BL UE 102 to determine if the CE level is changed. For example the BL UE 102, in the RRC connected state, is configured to determine the change in the CE level based on the DL Block Error Rate (BLER) and Radio Link Monitoring (RLM). The CE level detection related parameters and threshold may be signaled by the network through the System Information Blocks (SIB's) or through the dedicated RRC signaling for the each CE level (CE level-1 to the CE level-4). In an embodiment the CE level change can be determined if the target parameter/metric or a combination of these parameters exceeds the predefined threshold(s) assigned by the network.

Different thresholds are configured for different CE levels. The BL UE 102 coverage level is decided as follows where evaluation refers to set of parameters involved in the CE level determination and Threshold_CEx refers to the corresponding CE level change criteria, such as:

Normal Coverage: Evaluation>Threshold_CE1
CE level 1: Threshold_CE1>Evaluation>-Threshold_CE2
CE level 2: Threshold_CE2>Evaluation>Threshold_CE3
CE level 3: Threshold_CE3>Evaluation In an example, if the RSRP<Threshold_CE1 & RSRP>Threshold_CE2=>CE level 1.

In another example, if the (RSRP<Threshold_RSRP_CE1 & RSRQ<Threshold_RSRP_CE1) & (RSRP>Threshold_RSRP_CE2 & RSRQ>Threshold_RSRP_CE2)=>CE level 2.

If the BL UE 102 determines the change, at step 214, then, at step 216 the method includes indicating the change in the CE level. In an embodiment, the method allows the BL UE 102 to indicate the change in the CE level. In an embodiment, indicating the CE level change includes appending: a new Medium Access Control (MAC) Layer control element, a RRC message and a new Physical Uplink Control Channel (PUCCH).

In embodiment, the new MAC Layer control element can be represented as:

TABLE 3

| R | R | R | R | R | R | CE Level |
|---|---|---|---|---|---|----------|

A new logical channel ID has to be assigned to this MAC CE as indicated in Table 4.

TABLE 4

| Index | LCID values |
|---|---|
| 00000 | CCCH |
| 00001-01010 | Identity of the logical channel |
| 01011 | CCCH |
| 01100-10100 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |
| 10101 | Coverage Extension Level |

In an embodiment, the indication through the RRC message includes a new Information Element (IE) in the RRC connection setup complete and a RRC connection reconfiguration complete message as indicated below:

RRC connection reconfiguration complete-v13xy-IE's:=SEQUENCE {CE Level-r13 ENUMERATED {normal, CE1,CE2,CE3} OPTIONAL, non Critical Extension SEQUENCE { } OPTIONAL}

Further, the BL UE 102 is configured to indicate the CE level to the eNB 104 through measurement reporting. This can be achieved either by introducing a new measurement event which can be triggered and reported to the eNB 104 or by introducing a new IE in existing measurement report which may inform the eNB 104 about the CE level of the BL UE 102.

In an embodiment, since the UL control channel is available to the BL UE 102 when in the RRC connected state, the CE level change may be communicated to the eNB 104 through a MTC sub-band specific PUCCH periodically. In an embodiment, the new PUCCH format as shown below in Table-2 is introduced for the indicating the change in the CE level and this may be a 2 bit indication where 00 indicates normal coverage, 01 indicates CE level-1, 10 indicates the CE level-2 and 11 indicates the CE level-3.

TABLE 5

| Index | Values |
|---|---|
| 00 | Normal coverage |
| 01 | CE level 1 |
| 10 | CE level 2 |
| 11 | CE level 3 |

If the BL UE 102 determines, at step 214, that the CE level is unchanged then the method of the step 214 loops back to the step 212 in order to evaluate the CE level change based on the network assigned parameters (when in RRC connected state).

Further, at step 218, the method includes determining that the RRC connection of the BL UE 102 is released. If the RRC connection is released then the method, in accordance with storing the CE level (current CE level of the BL UE 102) of step 218 loops back to the step 206.

If the RRC connection is unreleased, thereon the method of the step 218 loops back to the step 212 in order to evaluate the CE level change based on the network assigned parameters (when in the RRC connected state).

The various actions, acts, blocks, steps, method(s), or the like in the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Further, all the above mentioned methods are indicating the CE level of the BL UE 102 to the eNB 104 and the eNB 104 may communicate the CE level to the MME.

In an embodiment, the BL UE 102 may directly indicate the CE level to the MME and the eNB 104 receives this information from the MME.

In an embodiment, the CE level to the MME is indicated in the RRC idle state through the TAU message, as detailed in FIGS. 4-5.

In an embodiment, the BL UE 102 informs the CE level by informing the MME through Non-Access Stratum (NAS) signaling messages like the TAU or ATTACH request messages where a new 2 bit IE has to be introduced where value 00 indicates normal coverage, 01 indicates CE level-1, 10 indicates CE level-2 and 11 indicates CE level-3.

Further, the sequence of messages and the procedures involved at the BL UE 102 and the eNB 104 during the CE level change indication in RRC connected state is illustrated in FIG. 3. The eNB 104 broadcasts the system information (MIB/SIB) containing MTC specific CE level based PRACH configuration, the parameter(s) and threshold for determining CE level, as detailed in the FIG. 3.

The CE level during the RRC connection establishment is determined by the eNB 104 based on the PRACH resource used for transmitting the random access preamble. As seen in the FIG. 2 and further detailed in the FIG. 3 the BL UE 102 upon receiving system information from the eNB 104 (or the network) may attempt for RRC connection establishment using the CE specific random access preamble/PRACH resource received over system information (SIB's). The CE level of the BL UE 102 is now known to the network and eNB 104 will associate the CE level specific repetitions to the data and control path transmission/reception to the BL UE 102. In the RRC connected state if the CE level change, the change in the CE level is indicated to the network/eNB 104.

FIG. 3 is a sequence diagram depicting various signaling messages between the BL UE 102 and the eNB 104 (BS) for indicating the CE level, according to an embodiment as disclosed herein. Initially, when the BL UE 102 is powered ON in RRC idle state, receives (302) the DL transmission broadcasted by the eNB 104. The DL transmission can include the SIB's (i.e., threshold to determine the CE level, CE level specific RA preamble, or the combination of these).

Upon receiving the DL transmission, the BL UE 102 determines the DL measurement report based on which the BL UE 102 is configured to determine (304) the CE level of the BL UE 102. Further, the CE level determined by the BL UE 102 is indicated (306), during the RRC connection establishment (for example, in RACH procedure, as detailed in the FIG. 2) to the eNB 104

In an embodiment, the available set of PRACH resources associated with each enhanced coverage level supported in the Serving Cell for the transmission of the Random Access Preamble, prach-ConfigIndex is known to the BL UE 102.

In an embodiment, if the UE is a BL UE 102 or a UE in enhanced coverage: instruct the physical layer to transmit a preamble with the number of repetitions required for preamble transmission corresponding to the selected preamble group (i.e., num Repetition Per Preamble Attempt) using the selected PRACH corresponding to the selected CE level, corresponding RA-RNTI, preamble index, and PREAMBLE_RECEIVED_TARGET_POWER.

In an embodiment, for LC/CE UEs, each PRACH coverage enhancement level, there is a PRACH configuration configured by higher layers with a PRACH configuration index, a PRACH frequency offset, a number of PRACH repetitions per attempt and optionally a PRACH starting subframe periodicity.

The eNB 104 is configured to decode (308) the CE level to determine the number of transmission repetitions required for the BL UE 102. The Random Access (RA) procedure (310) indication is signaled to the BL UE 102 and the eNB 104 resulting in the RRC connection there between.

In the RRC connected state, the BL UE 102 is configured to continuously evaluate the CE level in order to determine (312) the state of the CE level (i.e., monitoring the CE level to determine and indicate the CE level change).

If the change in CE level is detected (314), as a result of monitoring, then the BL UE 102 communicates (316) the change in the CE level to the eNB 104, as detailed in the FIG. 2 and in FIGS. 4-6. As a result, the eNB 104 in response to receiving the indication of the change in the CE level is configured to store the CE level (318) (example new CE level) of the BL UE 102, as detailed in the FIG. 6.

The eNB 104, therefore, initiates the RRC connected state (320) procedure based on the new CE level. The eNB 104 can indicate the RRC connection released indication to the BL UE 102.

The various steps in the sequence diagram may be performed in the order presented, in a different order or simultaneously. Further, in some embodiments, some of the steps may be omitted, added, modified, skipped, or the like without departing from the scope of the invention.

FIG. 4 is a flow diagram 400 illustrating a method for indicating the CE level change to the MME through the TAU, according to an embodiment as disclosed herein. At step 402, the method includes determining the CE level of the BL UE 102 in the DL measurement, as detailed in the FIG. 2. In an embodiment, the method allows the BL UE 102 to determine the CE level from the DL measurement.

At step 404, the method includes monitoring the CE level change, during the BL UE 102 in RRC idle camped state, based on the network assigned parameters (i.e., thresholds, CE specific resources). In an embodiment, the method allows the BL UE 102 to monitor the CE level change, during the BL UE 102 in the RRC idle camped state, based on the network assigned parameters (i.e., thresholds, CE specific resources).

At step 406, the method includes determining if the threshold for the CE level change is satisfied. In an embodiment, the method allows the BL UE 102 to determine if the threshold for the CE level change is satisfied.

If the threshold for the CE level is satisfied, then, at step 408, the method includes determining if the change in the CE level exceeds the predefined offset set by the eNB 104. If the change in the CE level exceeds the predefined offset, thereon, at step 410, the method includes triggering the TAU procedure indicating the new CE level to the eNB 104.

If the threshold for the CE level is not satisfied and if the change in the CE level is within the predefined offset set by the eNB 104, then, the method at step 408 and 410 includes looping back to the step 404 in order to monitor the CE level change based on the network assigned parameters.

In an embodiment, communicating the change in the CE level to the eNB 104, when in the RRC idle state, is improbable i.e., due to the unavailability of the resources. Therefore, the BL UE 102 must transition into the RRC connected state to provide the CE level change indication to the eNB 104. As the number of BL UE's in the cell is expected to be very high, it leads to congestion if each of these BL UE's attempt to establish the RRC connection when the CE level changes. In order to reduce this congestion and the associated signaling overhead, the CE level is communicated to the network through the TAU procedure.

The BL UE 102 in frequent mobility can change its CE level requirement frequently and hence each time TAU has to be triggered and this can increase the signaling load at the network and air interface. Therefore, a periodic update is required. The network may signal a set of parameters using which the CE level is determined. The BL UE 102 coverage level is decided as follows where evaluation refers to set of parameters involved in the CE level determination and Threshold_CEx refers to associated CE level change criteria, as detailed in the FIG. 2.

Further, in addition to thresholds for the CE level determination, the configured parameters also include the time, the threshold to be satisfied, a minimum time for which the BL UE 102 has remained in the present CE level and a minimum change of parameter configure to determine the CE level, within a given time which can trigger the CE level change indication to the network through the TAU procedure.

The sequence of messages and the procedures involved at the BL UE 102 and the eNB 104 during the CE level change indication in the RRC connected state is illustrated in FIG. 6. The network broadcasts the system information (MIB/SIB) containing MTC specific CE level based PRACH configuration, the parameter and the threshold for determining CE level. The BL UE 102 in the RRC idle state is configured to continuously evaluate if the change in the CE level exceeds the network configured threshold value. Once the condition is satisfied, the BL UE 102 sends the CE level change indication over the NAS signaling message (example, TAU) to the MME, the MME in turn communicates the CE level to the eNB 104.

The eNB 104 will now associate all idle modes signaling to the BL UE 102 based on the number of repetitions required for the new received CE level.

In an embodiment, if the condition for sending CE level change indication to the network is satisfied, the BL UE 102 can establish the RRC connection to the network for sending UL NAS signaling message. The UL NAS signaling message contains IE holding the CE level (for example new CE level) of the BL UE 102.

The various actions, acts, blocks, steps, method(s), or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a sequence diagram depicting various signaling messages between the BL UE 102, the eNB 104 and the MME for indicating the CE level through the TAU, according to an embodiment as disclosed herein. The BL UE 102 in idle state is configured to receive (502) the UL system Information transmission (i.e., SIB's) from the eNB 104. Further, the BL UE 102 upon receiving the UL system information from the eNB 104 is configured to determine the DL measurement based on which the BL UE 102 is configured to determine the CE level.

The BL UE 102, in the RRC connected state, is configured to evaluate (504) and detect if the change in the CE level is satisfied (or is within the predefined offset/threshold). If the change in the CE level exceeds the predefined offset then the RRC connection establishment (i.e., RA procedure) with piggy backed NAS message is communicated (506) between the BL UE 102 and the eNB 104.

The eNB 104 is configured to transmit (508) the NAS message to the MME through the TAU with the CE level indication, as detailed in the FIG. 4. The MME is configured to decode (510) in order to determine the CE level of the BL UE 102 and transmit (514) the CE level (decoded) to the eNB 104.

The eNB 104 in response to receiving the CE level indication from the MME (through signaling message) is configured to decode (516) the CE level of the BL UE 102. The eNB 104 therefore initiates the RRC connected state procedure (516) (i.e., Subsequent data and control plane activities performed with new CE) with the new CE level of the BL UE 102.

The various steps in the sequence diagram may be performed in the order presented, in a different order or simultaneously. Further, in some embodiments, some of the steps may be omitted, added, modified, skipped, or the like without departing from the scope of the invention.

FIG. 6 is a flow diagram 600 illustrating a method during reception of the CE level change indication from the BL UE 102, according to an embodiment as disclosed herein. At step 602, the method includes broadcasting the system information (MIB/SIB) containing MTC specific CE level based PRACH/random access configuration, the parameter and threshold for determining the CE level to the BL UE 102. In an embodiment, the method allows the eNB 104 to broadcast the system information (MIB/SIB) containing MTC specific CE level based PRACH/random access configuration, the parameter and threshold to determine the CE level to the BL UE 102.

At step 604, the method includes receiving the RRC connection establishment request from the BL UE 102. The RRC connection establishment includes receiving the RRC connection establishment request from the BL UE 102. In an embodiment, the method allows the eNB 104 to receive the RRC connection establishment request from the BL UE 102.

In an embodiment, the eNB 104 (or, the BS) is configured to detect the CE level of the BL UE 102.

At step 606, the method includes determining the CE level from the PRACH resource, the RA preamble used for PRACH or from subsequent data transfer with the required number of repetitions. Thus, the eNB 104 based on the CE level of the BL UE 102 can associate the respective number of repetitions for data and control activity towards the BL UE 102.

At step 608, the method includes performing the RRC connected state procedure in accordance with monitoring the BL UE 102 for detecting the CE level change. In an embodiment, the method allows the eNB 104 to perform the RRC connected state procedure in accordance with monitoring for BL UE 102 CE level change indication.

At step 610, the method includes receiving the CE level change indication form the BL UE 102. In an embodiment, the method allows the eNB 104 to receive the CE level change indication form the BL UE 102.

At step 612, the method includes receiving the new CE level (the change in the CE level) of the BL UE 102 and update the number of repetitions for the BL UE 102 based on the new CE level. In an embodiment, the method allows the eNB 104 to receive the new CE level (the change in the CE level) of the BL UE 102 and update the number of repetitions for the BL UE 102 based on the new CE level.

At step 614, the method includes detecting if the RRC connection is released, if the RRC connection is released then, the method of step 614 loops back to the step 604. If the RRC connection is unreleased, then, the method of step 614 loops back to the step 604.

The various actions, acts, blocks, steps, method(s), or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

In an embodiment, the eNB 104 is configured to apply the number of CE level specific transmission repetition for the BL UE 102 in the DL transmission when the BL UE in RRC idle state. The CE level specific transmission repetition is transmitted in the paging message on successive sub-frames, as detailed in FIGS. 7-8.

In an embodiment, for the BL UE 102 to not miss a paging message, the eNB 104 should be aware of the CE level of the BL UE 102. Based on the CE level, the eNB 104 can, therefore, repeat the paging message so that the BL UE 102 (or, the BL UE's) in different CE level can appropriately receive the paging messages.

In current 3GPP provisions, during idle state DRX, the BL UE 102 will wake up during its calculated paging frame (PF) and monitor paging occasion (PO). The PO is monitored at most once and then the BL UE 102 moves back to DRX sleep state.

$$SFN \bmod T = (T \operatorname{div} N)*(UE\_ID \bmod N)$$

$$i\_s = \operatorname{floor}(UE\_ID/N) \bmod Ns$$

The repetitions of the paging message are transmitted by the eNB 104 (or, the network) such that one paging repetition is transmitted in one paging cycle. The BL UE 102 monitors PO at most once and then moves back to the DRX sleep state. Hence, the BL UE 102 receives a single repetition during PO of the paging cycle. Therefore, it requires 'n' paging cycles to receive all 'n' repetitions of the paging message. As shown in the FIG. 7, the light shaded PO indicates the first transmission of paging message and the dark shaded PO indicates the subsequent repetitions of the first transmission. Further in the current 3GPP provision, assuming a total of four transmissions (repetitions) for each paging message in the CE level 1 and a default paging cycle (or idle state DRX—discontinuous reception) of 128 radio frames, it requires four paging cycles to receive all the transmissions. Therefore, if there is any high priority paging that is to be transmitted to the BL UE 102 during this time, it will be delayed till all the presented paging repetitions are received by the BL UE 102. In order to read the four repetitions of the same paging message, the BL UE 102 requires four DRX cycles and one PO is read in each of these for DRX cycles. This approach brings a limitation that a new paging message can be received only after four DRX cycles.

In an embodiment, the proposed method can facilitate the BL UE 102 to read all the transmissions related to a single paging message as fast as possible so that new paging messages if any can be received at the earliest. In an embodiment, multiple paging transmissions or repetitions can be received over a single the DRX cycle. In an embodiment, the eNB 104 can transmit the repetitions on the same subframe over successive radio frames as illustrated in FIG. 8. The network transmits one repetition of the same paging message in consecutive radio frames on the same subframe number (same PO on consecutive frames).

Unlike the conventional systems and methods, the proposed mechanism can therefore facilitate the BL UE 102 to completely read all 'n' repetitions of paging, in 'n' radio frames within the same paging cycle. As shown in the FIG. 8, the dark shaded PO indicates the first transmission of paging message and the light shaded PO indicates the subsequent repetitions. The FIG. 8 assumes a total of the four transmissions (repetitions) for each paging message in the assumed CE level and the DRX cycle here may be much greater than the one assumed in method illustrated in FIG. 7. In the FIG. 8, the BL UE 102 reads four paging repetitions in the same DRX cycle and same PO subframe but in successive radio frames. Therefore, in each DRX, now the BL UE 102 can check for the new paging message.

In an embodiment, the eNB 104 is configured to transmit the repetitions over the successive subframe following the first transmission of the paging message as shown in FIG. 9. In such cases, the 'n' repetitions are transmitted over 'n' consecutive DL sub-frames. The eNB 104 is configured to transmit the repetitions over each of the four sub-frames in a radio frame that can receive paging message (all possible POs in the radio frame may carry a repetition: sub-frames 0,4,5,9 in Frequency Division Duplex (FDD) and sub-frames 0,1,5,6 in Time Division Duplex (TDD).

The network (or, the eNB 104) pages the required BL UE 102 (or a group of the BL UE's) when the network or the application used by the BL UE 102 requires data from the BL UE 102. Once a paging is received (1002) by the BL UE 102, it establishes the RRC connection (1004) in order to send paging response to the network (or, eNB 104). The Paging response transmission, as per the provisions in current 3GPP specification (TS 36.331 Release 12), immediately after receiving paging is illustrated in FIG. 10.

In an embodiment, since the MTC is the cellular solution towards IoT (Internet of Things), there are very large numbers of the BL UEs that will be registered to the network.

Unlike the conventional systems and methods, where sending the paging message to each of these BL UE's increases the overload at the network side and also leads to resource wastage over the air interface. For applications where a large number of the BL UEs need to communicate to the network periodically, the application server may need to initiate paging to all these connected BL UEs frequently. Each request from the application server is paged to all the BL UEs at the same time and every BL UE 102 will attempt to establish the RRC connection (random access) in order to respond to the paging message. When most of these BL UEs are in the same LTE cell, the PRACH resources may not be enough to accommodate request from each of the BL UE 102 and may lead to RACH failures and also congestion.

Therefore the proposed mechanism can allow each BL UE 102 or a group of BL UE's to respond to paging message in a non-concurrent manner.

Further, the BL UE 102 grouping, since the BL UE 102 (for example the MTC devices) is delay tolerant and hence there is no significant problem if the response to the paging message is transmitted after a preset delay. Therefore, multiple paging time groups can be defined indicating that the BL UE 102 will respond to the received page after a predefined or network configured delay. Each group is associated with a predefined delay and the group to which the BL UE 102 belongs to can either be signaled by the network (response to TAU/any RRC message/DL MAC control element) or derived by the BL UE 102 (example, UE_Id mod num_paging_time_groups).

In an embodiment, the multiple paging time groups are defined for the BL UE 102 (network signaled-in TAU accept message or RRC downlink message or the MAC control element, or pre-defined is specification based on the UE ID or Temporary Mobile Subscriber Identity (TMSI) where each group is associated to a defined time delay for sending the response to the network. Once paging is received, the BL UE 102 will verify to which group it belongs to and initiate RRC connection request for sending paging response once the associated time is expired. Therefore, all the paged BL UEs may not be sending random access preamble for the RRC connection establishment, at the same time. As a result, the PRACH congestion is reduced and the more BL UEs can establish successful RRC connection and thereby send the paging response to the network.

In the extended paging messages mechanism, where the MTC applications may be involving the application server requiring certain periodic updates from each of the connected BL UE's using the application. This leads to the application server sending its request to LTE which in turn pages all the BL UE's availing service on it. Each time request is received from the application, the network sends a new paging message. Similarly, each time the BL UE's receive paging message, RACH is triggered for establishing the RRC connection. Since all the BL UEs which received paging will attempt RACH over the first available PRACH resource, the air interface congestion and RACH contention increases and many BL UEs will be denied service. Therefore, a more optimal solution is required to address the problem of congestion, contention and denial of service.

While paging for MTC devices/BL UE 102, in each MTC paging record may add a new IE indicating the time delay after which the BL UE 102 can attempt for sending the response to the paged message. If this type of application is periodic in nature and requires a new paging message periodically, the network may include a paging periodicity and counter as well so that the paged BL UE 102 will establish the new RRC connection on the expiry if the periodic timer with cause MT-Access. This will enable each BL UE 102 or a group of the BL UE's to send paging response at different time and hence avoid air interface congestion and contention. This will also reduce the paging load (signaling) on the network side as for each time, a new paging message does not have to be transmitted to each of the BL UEs associated and the BL UE 102 will establish connection after the periodic timer expiry.

In an embodiment, to avoid air interface congestion and RACH failures, it is optimal that different BL UEs respond to the paging message at different times. The MTC devices/BL UE 102 are delay tolerant and hence there is no significant problem if the response to a received paging message is transmitted after a preset delay. In the TAU Accept, the network may provide a paging response delay time (1102). This indicates that the UE when paged (start of delay timer) will send a response to the received paging message after the delay timer has expired. Each BL UE 102 or a group of BL UE's may have a different timer (1104) value (start paging response delay timer) to reduce congestion and PRACH overloading. Each BL UE 102 may be signaled with a different delay time to reduce congestion. The paging response transmission on the expiry of paging response delay timer (1106) is illustrated in FIG. 11.

The eNB 104 may over-ride the NAS/MME provided paging response delay time. Based on the RACH history and connection establishment request on the cell (total number of connection establishment attempts and number of BL UEs attempting the RRC connection establishment during a fixed duration of time), the eNB 104 may provide a shorter or longer delay time to a specific BL UE 102 or a group of BL UEs. This indication may be signaled in RRC message (1108) or MAC control element. Along with the delay time value, the method also provides an associated validity timer for which the provided delay time is valid. On expiry of the validity timer, the BL UE 102 reverts to the paging response delay time provided by the MME.

An alternative to the MME providing the delay timer is for the eNB 104 to determine and signal the paging response delay time to the relevant BL UEs. Since the congestion observed when large number of UEs attempt RRC connection establishment is over the PRACH, it is also possible that the delay timer is decided and provided by the eNB 104. Moreover, the eNB 104 is aware of which BL UEs are MTC UEs as the paging message from the MME contains the required information. The eNB 104 may signal in the dedicated RRC message or through a new MAC control element.

Unlike the conventional systems and methods, where the BL UE 102 receives the DL data on Physical Downlink Shared Channel (PDCCH) based on the control information received over the PDCCH. The size of PDCCH is received from Physical Control Formal Indicator Channel (PCFICH) which is presented at the start of the subframe (in terms of both time and frequency bandwidth of the sub-frame). Since the BL UE 102 operates over a sub-band of the entire system (i.e., LTE) bandwidth, it will not have access to PCFICH and hence the PDCCH. Therefore, it is not possible to identify the resources over which these common control messages like paging, RAR, or the like.

In an embodiment, the proposed method defines a Common Control Message Reception for receiving common control messages for the BL UE's.

In an embodiment, the BL UE 102 is configured to receive the DCI message from the eNB 104, wherein the DCI message is received through one of the PDCCH on each of a MTC sub-band and an evolved PDCCH (ePDCCH).

In order to maintain similar operation as that of other LTE devices, the eNB 104 is configured to design a new PDCCH for the BL UE's one each of the MTC sub-band(s). The new PDCCH may then be used to carry the DCI information to the relevant BL UE's. These DCI messages will carry the scheduling information of the downlink common control messages based on which the BL UE 102 can now decode the transport block presented on the PDSCH.

Further, in an embodiment, a new ePDCCH (evolved PDCCH) on each of the MTC sub-bands which can be utilized only by the BL UE's presented in the sub-band.

In current 3GPP standard, the ePDCCH is presently allowed only in the RRC connected state and is signaled over RRC connection reconfiguration. In order to receive common control messages, ePDCCH has to be extended to the RRC idle state operation as well. Additionally, they will not be signaled over system information. The ePDCCH is currently allocated in pairs of RBs (2/4/8 RB pairs). Since one MTC sub-band is restricted to 6 RBs, ePDCCH allocation for the BL UE 102 sub-bands has to be modified to 2/4/6 RB pairs. When ePDCCH occupies the complete MTC sub-band, only control information can be received during a sub-frame.

In an embodiment, an advanced scheduling method is proposed herein to accommodate for scheduling of the DCI information on the PDCCH over a subframe prior to actual PDSCH transmission (cross sub-frame scheduling). The DCI received here will provide the time relation between the control channel and the associated traffic channel.

Unlike the conventional systems and methods, the proposed mechanism can therefore design a control channel less (PDCCH/ePDCCH less) operation. For decoding the transport block mapped on PDSCH, the BL UE 102 should have information related to the modulation and coding scheme (MCS) used, the number of physical resource block (PRB) over which Transport Block (TB) is transmitted and the frequency range on which the TB is presented on the PDSCH. If these details are known, it is possible for the UE to decode the PDSCH transport block. In this method, the control information for these messages (example: MCS, PRB etc) are predefined or signaled over system information. The BL UE 102 can utilize these control information and perform a blind decoding of these messages over the traffic channel without the use of DCI from the PDCCH/ePDCCH.

In an embodiment, the control channel less (PDCCH/ePDCCH less) operation is introduced herein. For decoding the TB mapped on the PDSCH, the BL UE 102 should have information related to the modulation and coding scheme (MCS) used, the number of physical resource block (PRB) over which the TB is transmitted and the frequency range on which the TB is presented on the PDSCH. If these details are known, it is possible for the BL UE 102 to decode the PDSCH transport block.

Thus, in an embodiment, the control information for these messages (example, MCS, PRB, or the like) are predefined or signaled over system information. Therefore, the BL UE 102 can utilize the control information and perform a blind decoding of these messages over the traffic channel without the use of DCI from PDCCH/ePDCCH.

In Long Time Evolution (LTE), the PRACH density on the FDD frame structure is different from that of the TDD frame structure. The FDD or frame structure type 1 uses preamble format 0-3 and there is at most one random access resource per subframe. In TDD or frame structure type 2 uses preamble formats 0-4 and there might be multiple random access resources in an UL subframe (or UpPTS—Uplink Pilot Time Slot for preamble format 4) depending on the UL/DL configuration. Highest density is 6 PRACH in one radio frame.

With the use of MTC devices in the IoT, the number of devices in a cell is expected to be very large and there will be a very high density of MTC devices in a cell which will involve in small data communication sessions. The high density of MTC UEs per cell will lead to increase in random access contention. To avoid this, the number of PRACH resources in a frame or the density of PRACH in a sub-frame has to be increased. The number of PRACH resource per sub-frame in FDD frame structure has to be increased to more than 1. Similarly for TDD, the density of PRACH per radio frame has to be increased to more than 6.

The additional PRACH in addition to the already existing PRACH may be shared among all BL UEs (both normal BL UEs and BL UE 102) to allow for better probability in the RRC connection establishment.

In an embodiment, an additional PRACH which can be used by both normal UEs and the BL UE 102 is proposed herein, the need for support of increased capacity for the RACH is satisfied and there are additional resources to attempt RA. One problem which will arise is that BL UE 102 has to tune to the frequency band on which PRACH is available and perform RACH. Such PRACH may also be fixed over the central 6 resource blocks of a subframe. After successful transmission of the PRACH preamble, the BL UE 102 has to monitor for random access response message. One approach is to stay in the sub-band over which RA preamble was transmitted and monitor for RAR. The BL UE 102 does not remain in the MTC sub-band assigned to it by the network.

In an embodiment, the BL UE 102 is configured to hop back to the MTC sub-band to which it has been assigned by the network after successful transmission of the PRACH preamble. This PRACH configuration can be signaled over the system information for both normal UEs and the BL UE 102. In this approach, it is not possible for the network to identify if random access preamble received is from the normal UE or from the BL UE 102. In an embodiment, a new preamble format is proposed herein that can be used by all the BL UEs while performing random access.

*Each preamble formats have difference sequence lengths but the network can attempt to decode the PRACH only using a single format which was signaled to the BL UE 102 through the SIB's. Also, the PRACH configuration is modified and the network complexity for decoding the PRACH is increased and the BL UE 102/network now has to monitor PRACH for two different preamble formats.

In an embodiment, a new preamble group (example: group C) can be introduced that can be used by all the BL UEs while performing random access. As there are dedicated preambles assigned to each of the preamble groups, it brings a restriction in maximum number of MTC UEs and normal UEs having successful RACH. (Number of successful RA possible over a PRACH resource of the BL UE 102=Number of preambles dedicated for preamble group C).

In an embodiment, the new PRACH(s) is proposed herein, which caters to only BL UEs and signaled over the MTC specific system information. This new PRACH may be time or frequency multiplexed over different sub frames and different MTC sub-bands. With this approach, it is easier for the network to identify the R13 UEs band on the PRACH on which RA preamble is received as only the BL UEs will send preamble over this PRACH resource. After successful transmission of PRACH preamble, the BL UE 102 has to monitor for random access response message. One approach is to stay in the sub-band over which RA preamble was transmitted and monitor for Random Access Response (RAR).

The BL UE 102 does not remain in the MTC sub-band assigned to it by the network. Another approach is to hop back to the MTC sub-band to which it has been assigned by the network after successful transmission of preamble. It may also be that each MTC sub-band will have a band specific PRACH resource and the MTC UEs will attempt random access only over the PRACH in its sub-band. All the PRACH configuration may either be signaled over a common MTC SIB or specific sub-band PRACH configuration may be transmitted over a sub-band specific SIB.

If the network (NW) knows the CE level of the BL UE 102 from the PRACH transmitted, the associated random access response can be provided to the corresponding BL UE 102 with the appropriate number of repetitions. The reception of random access response message is as per the methods provided for common control message reception. The UL grant allocation size carried on RAR for MSG3 is 20 Bytes and with fixed scheduling characteristics, this can be reduced to make RAR message smaller if required.

Accordingly the embodiments herein provides the mechanism for initiating a timing relation after last repetition of a message, wherein the last repetition provides resources for: transmitting the UL data, by the BL UE 102 in one of a successive sub frames and periodic sub frames and transmitting, by the eNB 104, at least one of the HARQ feedback and a DL data, in response to receiving the last repetition in one of successive sub frames and periodic sub frames from the BL UE 102.

In an embodiment, the mechanism further includes transmitting, by the BL UE 102, at least one of the HARQ feedback and the UL data in one of a successive sub frames and periodic sub frames.

For frame structure type 1 or FDD, the downlink reception (subframe n) to the associated uplink transmission (subframe k) follows the timing relationship of n+k, where k=4. Therefore, the uplink is transmitted on the 4th sub frame from the time of reception. For frame structure type two or the TDD, the downlink reception (subframe "n") to the associated UL transmission (subframe k) follows the timing relationship of n+k, where k>=4. However, for the BL UEs, not in normal coverage (in extended coverage) network applies repetitions to a packet based on the CE level the BL UE 102 is currently using. These repetitions may either be received in successive sub frames Transmit Time Intervals (TTIs) or may be transmitted in the periodic sub frames or randomly based on resource allocation by the network.

Further, when repetitions are transmitted on successive TTIs from the network, the relationship n+k where k is a predefined value will not hold true if this is evaluated from the 1st repetition as the decision of successful decode can be made only after all the repetitions are over. Therefore, the last repetition will provide the resources for transmitting the HARQ feedback or the UL data or both as illustrated in FIG. 12. Alternatively, the timing relation may start from the moment the DL data is successfully decoded as illustrated in FIG. 13. In this case, the UL feedback will be transmitted over the next opportunity to transmit feedback over Physical Uplink Control Channel (PUCCH) or over an available Physical Uplink Shared Channel (PUCCH). The DL repetitions may either be received on consecutive TTIs using the same grant as provided for the first transmission of the message or may be signaled through the DCI messages each time or the DL assignments for repetition may be semi-persistent in nature.

For frame structure type 1 or the FDD, the UL transmission (subframe n) to the associated DL reception (subframe k) follows the timing relationship of n+k, where k=4. Therefore, the DL is received on the 4th subframe from the time of transmission. For frame structure type 2 or TDD, the UL transmission (subframe n) to the associated DL reception (subframe k) follows the timing relationship of n+k, where 4<=k<=7. However, for BL UEs not in normal coverage (in extended coverage) the network applies repetitions to a packet based on the CE level of the BL UE 102 is currently using. These repetitions may either be transmitted in successive sub frames (or TTIs) or may be transmitted in the periodic sub frames or randomly based on resource allocation by the network.

In an embodiment, for LC/CE UE's, each PRACH coverage enhancement level, there is a PRACH configuration configured by higher layers with a PRACH configuration index, a PRACH frequency offset, a number of PRACH repetitions per attempt and optionally a PRACH starting subframe periodicity.

In an embodiment, frame structure type 1 with preamble format 0-3, for each of the PRACH configurations there is at most one random access resource per subframe.

When repetitions are transmitted on successive TTIs by the BL UE 102, the relationship n+k where k is a predefined value will not hold true if this is evaluated from the 1st repetition as the decision of successful decode by the eNB 104 can be made only after all the repetitions are over. In this case, the HARQ feedback from network is expected after the transmission of the last repetition as illustrated in FIG. 14.

In an embodiment, for BL UEs or UEs in enhanced coverage, the parameter DL_REPETITION_NUMBER provides the number of transmissions repeated in a bundle. The HARQ feedback is transmitted for the bundle and a downlink assignment corresponding to a new transmission or a retransmission of the bundle is received after the last repetition of the bundle.

In an embodiment, for the BL UE or UEs in enhanced coverage, the parameter UL_REPETITION_NUMBER provides the number of transmission repetitions of within a bundle. Bundling operation relies on the HARQ entity for invoking the same HARQ process for each transmission that is part of the same bundle in consecutive sub-frames. Within a bundle HARQ retransmissions are non-adaptive and are triggered without waiting for feedback from previous transmissions according to UL_REPETITION_NUMBER. An uplink grant corresponding to a new transmission or a retransmission of the bundle is only received after the last repetition of the bundle.

Further, if the eNB 104 is able to successfully decode the uplink message before the last repetition, the HARQ feedback is transmitted by the eNB 104 to the BL UE 102 to indicate the successful reception of the message as detailed in FIG. 15. On receiving the positive feedback from the eNB 104, the BL UE 102 suspends the transmission of the pending repetitions. The UL repetitions may either be transmitted on consecutive TTIs using the same grant as provided for the first transmission of the message or may be signaled through the DCI messages each time or the uplink grants for repetition may be semi-persistent in nature.

In the RACH procedure, the contention resolution timer is presently started immediately on transmission of MSG3. In CE scenario where MCG3 transmission will have several repetitions, starting the contention resolution timer may lead to premature declaration of RACH failure and network may not get sufficient time to send the contention resolution message if the first few repetitions of MSG3 are not decoded correctly at the network. Therefore, it is optimal to start contention resolution timer after the transmission of the last uplink repetition of MSG3. Alternatively, the contention resolution timer may be started once positive HARQ feedback is received for the transmitted repetitions even if some repetitions are still pending for transmission.

During cell selection, the BL UE 102 tunes to the central 1.4 MHz or central 6 PRBs in order to detect Primary Synchronization Signal (PSS), Secondary Synchronization Signal (SSS) and to read Master Information Block (MIB). There are 2 ways in which the MTC UEs may operate once MIB is acquired as illustrated in FIG. 16-18.

FIG. 16 is a flow diagram 1600 illustrating a method for intra frequency measurement, according to an embodiment as disclosed herein. At step 1602, the method includes synchronizing with an intra frequency neighbor cell by considering the neighbor cell as an inter frequency cell in a Radio Resource Control (RRC) idle state. In an embodiment, the method allows the BL UE 102 to synchronize with an intra frequency neighbor cell by considering the neighbor cell as an inter frequency cell in a Radio Resource Control (RRC) idle state.

At step 1604, the method includes performing measurements on the neighbor cell post-synchronization by considering the neighbor cell as an intra-frequency cell, wherein the measurements is performed by maintaining measurement bandwidth equal to an operating sub-band of the BL UE 102. In an embodiment, the method allows the BL UE 102 to perform the measurements on the neighbor cell post-synchronization by considering the neighbor cell as an intra-frequency cell, wherein the measurements is performed by maintaining measurement bandwidth equal to an operating sub-band of the BL UE 102.

At step 1606, the method includes monitoring the center frequency of the LTE system bandwidth of the neighbor cell, when the BL UE 102 is in the RRC connected state and camped on central Physical Resource Blocks (PRBs). The method allows the BL UE 102 to monitor the center frequency of the LTE system bandwidth of neighbor cell, when the BL UE 102 is in the RRC connected state and camped on central Physical Resource Blocks (PRBs), (i.e., in response to receiving the measurement configuration from the eNB 104.

At step 1608, the method includes tuning to a center frequency of the serving cell (i.e., neighbor cell) and tuning away from a sub-band frequency of the serving cell. In an embodiment, the method allows the BL UE 102 to tune to the center frequency of the serving cell and tune away from the sub-band frequency of the serving cell.

At step 1610, the method includes determining that Connected-Discontinuous Reception (C-DRX) is configured by the eNB 104. In an embodiment, the method allows the BL UE 102 to determine that Connected-Discontinuous Reception (C-DRX) is configured by the eNB 104.

At step 1612, the method includes performing an intra-frequency neighbor cell detection and synchronization during an inactive duration of the C-DRX cycle. In an embodiment, the method allows the BL UE 102 to perform the intra-frequency neighbor cell detection and synchronization during an inactive duration of the C-DRX cycle.

FIG. 17 is a sequence diagram depicting various signaling messages between the BL UE 102 and the eNB 104 for intra frequency measurement, according to an embodiment as disclosed herein. Once the BL UE 102 tunes (1702) to central 6 PRBs/MTC central sub ban, then, the synchronization signals (1704) is received from the eNB 104. The BL UE 102 can initiate the RRC connection establishment procedure for which the BL UE 102 acquire the cell (1706) and achieve synchronization. Further, the BL UE 102 is configured to receive the MTC SIB with PRACH configuration (on central six PRBs) from the eNB 104.

The BL UE 102 can select (1710) the available PRACH resource to transmit the RA preamble transmission (1712) to the eNB 104. As a result, the RRC connection establishment in the MTC sub-band between the BL UE 102 and the eNB 104 is indicated (1714).

The BL UE 102 is configured to initiate the RRC connected procedure (1716) on the central MTC sub-band. Further, the BL UE 102 receives (1718) the RRC connection reconfiguration with the MTC sub-band hopping command from the eNB 104. The BL UE 102 is configured to hop (1720) to target MTC sub-band.

The BL UE 102 upon hopping to the target MTC sub-band is configured to transmit (1722) the RRC connection reconfiguration on new sub-band to the eNB 104. The eNB 104 transmits (1724) the RRC connection release with optional target sub-band index.

Further, as detailed in the FIG. 17, after the successfully decoding MIB, the BL UE 102 will continue to remain on the central 6 PRBs or the central MTC sub-band. The PRACH will be configured on the central 6 PRBs to facilitate RRC connection establishment over the central MTC sub-bad. In this case, RRC connection is attempted by sending random access preamble over the PRACH available in the central sub-band. Once RRC connection is successfully established, the UE may get hopped on to different MTC sub-band to carry proceed with connected state procedures.

When RRC connection is released, the BL UE 102 may either remain in the MTC sub-band on which it received the RRC connection release message, or move back to the central 6 PRBs as PRACH is known to be available there. In an embodiment, the network may provide a target sub-band to the BL UE 102 in the RRC connection release message asking the BL UE 102 to move on to a specific MTC sub-band to perform idle state procedures. When RRC connection is released, the BL UE 102 needs to perform cell selection again which includes Primary Synchronization Signal (PSS), Secondary Synchronization Signal (SSS), Master Information Block (MIB) decode which are available on the central MTC sub-band. Therefore, the BL UE 102 needs to tune to central sub-band and after cell selection, it needs to hop to the sub-band assigned by the network in the RRC connection release message.

As illustrated in FIG. 17 and FIG. 18, after successful synchronization to the cell, the MIB is decoded. The MIB may contain the target sub-band for the MTC UE 102. Alternatively, the target MTC sub-bands (the sub-band on which the MTC UE will camp and perform idle state procedures) information may be signaled on the MTC SIB. MTC SIB may signal a reference sub-band number and the sub-band to which the UE has to operate on is calculated as follows: UE_MTC_sub-band=UE_id % Reference_MTC_Sub-band.

In both the cases, the RRC connection establishment to the network is attempted by sending random access preamble over the PRACH available in the MTC sub-band. If there is no PRACH available in the sub-band, then the BL UE 102 will tune to the sub-band on which PRACH availability is known and perform random access over it. Once the RRC connection is successfully established, the BL UE 102 may get hopped on to different MTC sub-band to carry proceed with connected state procedures. If the number of BL UEs operating on a sub-band is higher than that of other sub-bands, the eNB 104 may for the purpose of load balancing, hop the BL UE 104 to operate under a sub-band different from the one derived from system information.

When the RRC connection is released, the BL UE 102 may either remain in the MTC sub-band on which it received the RRC connection release message, or move back to the sub-band to which it was signaled through MIB or SIB. Alternatively, network may provide a target sub-band to the BL UE 102 in the RRC connection release message notifying the BL UE 102 to move on to the specific MTC sub-band to perform idle state procedures. When the RRC connection is released, the BL UE 102 needs to perform cell selection again which included PSS, SSS, MIB decode which are available on the central MTC sub-band. Therefore, the BL UE 102 needs to tune to central sub-band and after cell selection, it needs to hop to the sub-band assigned by the network in the RRC connection release message.

In RRC idle state, when the BL UE 102 is not camped on the central 6 PRBs and intra-frequency measurements and ranking are configured, the BL UE 102 treats the neighbor cell as inter frequency till it achieves synchronization to the neighbor cell. Following synchronization, the neighbor cells are treated as intra frequency cells and measurements are performed on the target cell by maintaining the measurement bandwidth equal to the operating MTC sub-band of the BL UE 102.

When measurement configuration is received from the network, the measurement objects that are configured as inter-frequency and intra-frequency is with respect to the LTE system bandwidth (or center frequency of the LTE system) and not based on the LTC sub-band operation frequency. Therefore, measurement objects configured as intra frequency measurement may not be intra frequency for the BL UEs as the MTC UEs may be operating on a sub-band different from the central 6 PRBs. The BL UE 102 monitors the center frequency of the system bandwidth only if it is camped on the central 6 PRBs or the central MTC sub-band. This is a result of the MTC device restrictions that it can support radio frequency (RF) bandwidth of only 1.4 MHz while the LTE system bandwidth may be as high as 20 MHz.

If the BL UE 102 is in RRC connected state and is not operating on the central 6 PRBs, and intra-frequency measurements are configured, the BL UE 102 will not be able to perform measurements of the neighbor cell. In such cases, the BL UE 102 treats the neighbor cell as inter frequency till it achieves synchronization to the neighbor cell. Therefore it requires measurement gap to perform synchronization with the neighbor cell as the BL UE 102 is currently operating on a different sub-band and not having the neighbor cell's center frequency within its operating and RF bandwidth. During this measurement gap, the BL UE 102 tunes away from the MTC sub-band frequency and tunes to the central system frequency (central 6 PRBs/central MTC sub-band) to monitor for synchronization signals.

The measurement gap may either be signaled by the network or may be autonomously detected and applied. Autonomous measurement gaps are applied by the BL UE 102 based on inactive transmission duration in connected state. Measurement gap is required only till the completion of synchronization to the neighbor cell. Following synchronization, the neighbor cells are treated as the intra frequency cells and measurements are performed on the target cell reference signals over neighbor cell bandwidth overlapping with the operating MTC sub-band of the BL UE 102.

If the BL UE 102 is camped on an MTC sub-band which does not overlap with the central 6 PRBs of the serving cell, the BL UE 102 has to tune away from the serving sub-band frequency and tune to the serving cell center frequency. If the C-DRX is configured for the BL UE 102, then the intra-frequency neighbor detection and synchronization can be performed during the inactive duration of the C-DRX cycle. After completing the active time of the C-DRX, the BL UE 102 may tune to the center frequency and monitor for synchronization signals. Once the synchronization to neighbor cell is achieved, measurements can be performed on the reference signals of neighbor cell bandwidth overlapping with the operating MTC sub-band of the BL UE 102.

In an embodiment, when the BL UE 102 is aware that it may be hopped to any MTC sub-band by the network, and that it may not be operating on the central sub-band. Therefore, achieving synchronization to neighbor cell once it is hoped to a sub-band different from the central sub-band is difficult. Therefore, during the time at which it is operating on the central sub-band (immediately after cell selection and the BL UE 102 always have to operate on the central sub-band for synchronization and cell selection), the BL UE 102 may also attempt to detect any neighbor cells configured on the same frequency and achieve synchronization to it. The BL UE 102 will maintain the synchronization to these neighbor cells even once it is hoped to another MTC sub-band or when it transitions to the RRC connected state.

In an embodiment, once the BL UE 102 hops to a different sub-band or transitions to the RRC connected state, the synchronization to the neighbor cell is maintained. The measurements can be performed on the reference signals of neighbor cell bandwidth overlapping with the operating MTC sub-band of the BL UE 102. If there are different cells from the once that are already synchronized to (when the BL UE 102 was in central sub-band), that is signaled in connected state measurement configuration, the BL UE 102 may either ignore the additional cell, or use autonomous gaps if network has not provided measurement gap configuration, to achieve synchronization to these new cells. Once the synchronization to neighbor cell is achieved, measurements can be performed on the reference signals of neighbor cell bandwidth overlapping with the operating MTC sub-band of the BL UE 102.

In an embodiment, to perform cell selection on LTE cell, it has to satisfy the S-criteria which provide a minimum threshold of signal strength or quality for camping on a cell. The BL UEs that are capable of operating in extended coverage will be able to operate with acceptable quality even when it receives weaker signal as compared to that of normal coverage UEs (other than the BL UE 102). However, the current S-criteria does not accommodate for UE in coverage enhancement mode of operation. With the presented conditions in S-criteria evaluation, there may be some instances where the BL UE 102 is not able to select/reselect the cell in coverage enhancement mode. Thus a new parameter and enhancement of S criteria to perform cell selection for the BL UE 102 is been introduced herein.

The new parameter Qce holds an additional offset which can be used for evaluating the S-criteria. While evaluating S-criteria for extended coverage, the BL UE 102 will additionally include Qce in the evaluation. If Both the serving cell/cell under evaluation of S-criteria and the BL UE 102 support operation under extended coverage, then the BL UE 102 will evaluate the S-criteria of the cell only based on the S-criteria for extended coverage. S-criteria evaluation for extended coverage is illustrated below:

Srxlevmin=Qrxlevmeas−(Qrxlevmin+Qrxlevminoffset−Qce)−Pcomp−Qoffsettemp

Squalmin=Qqualmeas−(Qqualmin+Qqualminoffset−Qce)−Qoffsettemp.

Even though the cell supports operation under four distinct coverage levels, cell selection evaluation has to happen only for the largest coverage. Therefore, a single threshold for extended coverage (related to the largest level of extended coverage) needs to be signaled over SIB for cell selection evaluation.

Alternatively, the network may signal different values for each of the supported CE levels. Under such cases, the network has to signal values for Qce1, Qce2 and Qce3. When the network signals different values, then the UE should be able to evaluate its current CE level prior to evaluating S-criteria of the cell. The CE level specific offset of Qce will be used in evaluation of S-criteria.

Another alternative to correctly evaluate S-criteria for a cell supporting extended coverage operation is by using CE level specific threshold (Qrxlevmin). There may be one threshold for normal coverage and another threshold for extended coverage. If Both the serving cell/cell under evaluation of S-criteria and UE support operation under extended coverage, then the UE will evaluate the S-criteria of the cell only based on the S-criteria for extended coverage.

Since the BL UEs in extended coverage can operate under signal conditions weaker than that of normal UEs, it is possible that the BL UE 102 under extended coverage can receive service on a cell longer than that of a normal UE. Therefore, in comparison to a normal UE, the BL UEs supporting CE may perform reselection to a neighbor cell later. When both serving and the neighbor cell are of equal priority, then the reselection decision is taken based on the ranking of cells and reselection to highest ranked cell is performed. Therefore, if it is desired that the BL UE 102 remains on the serving cell supporting CE for as long as possible, then the cell reselection evaluation and ranking should happen as late as possible.

Therefore, the threshold for starting neighbor measurements (S-intrasearch/S-nonintraseach) for the BL UEs with CE has to be set differently from that of normal coverage UEs. For the BL UEs with CE, a much lower threshold may be set as compare to that or normal coverage UEs. Therefore, network may signal S-intrasearch for normal coverage UEs and S-intra search, CE for UEs supporting CE. Similarly, network may signal S-nonintrasearch for normal coverage UEs and S-nonintrasearch, CE for UEs supporting CE. These parameters may be signaled through the MTC-SIB message.

*However, when serving and neighbor cells are on frequencies with different priorities, the evaluation happens such that the BL UE 102 receives the service on the higher priority cell for long enough. In such cases, the same threshold as used for normal coverage UEs will not serve the purpose and may lead to faster reselection without staying on the higher priority cell long enough. Therefore, new thresholds specific to CE supported BL UEs have to be signaled as well (S non-intra search, CE, Threshx, low, CE and Threshservinglow, CE). These parameters may be signaled through the MTC-SIB message from the eNB 104.

The BL UEs are expected to engage in infrequent and low mobility. Therefore, if a periodic measurement is configured for reporting by the network, for a large duration of time the last measured values may not vary from the previous measurements due to no or very low mobility. Therefore, when the cell specific reference signal measurements have not varied beyond a pre-defined or a network signaled threshold, periodic measurements are not reported. Additionally, while sending the periodic measurement report, it may indicate a new information element "no report" to the network. This new IE informs the network that the BL UE 102 will not be performing periodic reporting of the measurement unless the required threshold of reference signal measurement variation is encountered. Alternatively, the BL UE 102 may maintain an internal timer (integral multiple of network assigned periodicity) during which, if reference signal measurements are not varying, measurement report with the network configured periodicity is not reported. On expiry of the internal timer, the measurement report is transmitted to network. In such cases when periodic reporting is not performed, the network assumes that the measurement values of the target measurement object has not changed and is similar to the last reported value.

The embodiments disclosed herein can be implemented through at least one software program running on at least one hardware device and performing network management functions to control the elements. The elements shown in the FIGS. 1 through 18 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:
1. A method of a terminal, the method comprising:
receiving configuration information from a base station;
receiving a reference signal from the base station;
determining a coverage extension (CE) level based on a measurement result of the reference signal and the configuration information;
selecting a physical random access channel (PRACH) resource corresponding to the determined CE level; and
transmitting, to the base station, a random access preamble using the selected PRACH resource,
wherein the configuration information includes PRACH resource information for each CE level, and at most one RACH resource for the each CE level is configured per subframe for frame structure type 1.

2. The method of claim 1, wherein the configuration information includes at least one threshold value for determining the CE level for the PRACH.

3. The method of claim 1, wherein the determining of the CE level comprises:
determining the CE level as CE level 3, in case that the measurement value is less than a third threshold value;
determining the CE level as CE level 2, in case that the measurement value is less than a second threshold value and greater than or equal to the third threshold value;
determining the CE level as CE level 1, in case that the measurement value is less than a first threshold value and greater than or equal to the second threshold value; and
determining the CE level as CE level 0, in case that the measurement value is greater than or equal to the first threshold value.

4. The method of claim 1, wherein the configuration information includes PRACH parameters for each CE level.

5. The method of claim 1, wherein the terminal comprises a bandwidth reduced low complexity user equipment (BL UE).

6. A method of a base station, the method comprising:
transmitting configuration information to a terminal;
transmitting a reference signal to the terminal; and
receiving, from the terminal, a random access preamble using a physical random access channel (PRACH) resource corresponding to a coverage extension (CE) level determined by the terminal based on a measurement result of the reference signal and the configuration information,
wherein the configuration information includes PRACH resource information for each CE level, and at most one RACH resource for the each CE level is configured per subframe for frame structure type 1.

7. The method of claim 6, wherein the configuration information includes at least one threshold value for determining the CE level for the PRACH.

8. The method of claim 6, wherein the CE level is determined to be CE level 3, in case that the measurement value is less than a third threshold value, the CE level is determined to be CE level 2, in case that the measurement value is less than a second threshold value and greater than or equal to the third threshold value, the CE level is determined to be CE level 1, in case that the measurement value is less than the first threshold value and greater than or equal to the second threshold value, and the CE level is determined to be CE level 0, in case that the measurement value is greater than or equal to the first threshold value.

9. The method of claim 6, wherein the configuration information includes PRACH parameters for each CE level.

10. The method of claim 6, wherein the terminal comprises a bandwidth reduced low complexity user equipment (BL UE).

11. A terminal comprising:
a transceiver; and
a controller coupled with the transceiver and configured to receive configuration information from a base station, receive a reference signal from the base station, determine a coverage extension (CE) level based on a measurement result of the reference signal and the configuration information, select a physical random access channel (PRACH) resource corresponding to the determined CE level, and transmit, to the base station a random access preamble using the PRACH resource,
wherein the configuration information includes PRACH resource information for each the CE level, and at most one RACH resource for the each CE level is configured per subframe for frame structure type 1.

12. The terminal of claim 11, wherein the configuration information includes at least one threshold value for determining the CE level for the PRACH.

13. The terminal of claim 11, wherein the controller is further configured to determine, the CE level as CE level 3, in case that the measurement value is less than a third threshold value, determine the CE level as CE level 2, in case that the measurement value is less than a second threshold value and greater than or equal to the third threshold value, determine the CE level as CE level 1, in case that the measurement value is less than a first threshold value and greater than or equal to the second threshold value, and determine the CE level as CE level 0, in case that the measurement value is greater than or equal to the first threshold value.

14. The terminal of claim 11, wherein the configuration information includes PRACH parameters for each CE level.

15. The terminal of claim 11, wherein the terminal comprises a bandwidth reduced low complexity user equipment (BL UE).

16. A base station, comprising:
a transceiver; and
a controller coupled with the transceiver and configured to transmit configuration information to a terminal, transmit a reference signal to the terminal, and receive, from the terminal, a random access preamble using a physical random access channel (PRACH) resource corresponding to a coverage extension (CE) level determined by the terminal based on a measurement result of the reference signal and the configuration information,
wherein the configuration information includes PRACH resource information for each CE level, and at most one RACH resource for the each CE level is configured per subframe for frame structure type 1.

17. The base station of claim 16, wherein the configuration information includes at least one threshold value for determining the CE level for the PRACH.

18. The base station of claim 16, wherein the CE level is determined to be CE level 3, in case that the measurement value is less than a third threshold value, the CE level is determined to be CE level 2, in case that the measurement value is less than a second threshold value and greater than or equal to the third threshold value, the CE level is determined to be CE level 1, in case that the measurement value is less than the first threshold value and greater than or equal to the second threshold value, and the CE level is determined to be CE level 0, in case that the measurement value is greater than or equal to the first threshold value.

19. The base station of claim 16, wherein the configuration information includes PRACH parameters for each CE level.

20. The base station of claim 16, wherein the terminal comprises a bandwidth reduced low complexity user equipment (BL UE).

* * * * *